United States Patent [19]
Huber

[11] Patent Number: 4,918,593
[45] Date of Patent: Apr. 17, 1990

[54] RELATIONAL DATABASE SYSTEM

[75] Inventor: Val J. Huber, Chelmsford, Mass.

[73] Assignee: Wang Laboratories, Inc., Lowell, Mass.

[21] Appl. No.: 1,474

[22] Filed: Jan. 8, 1987

[51] Int. Cl.⁴ .............................................. G06F 7/00
[52] U.S. Cl. ................................. 364/200; 364/282.1; 364/283.4; 364/974; 364/974.4
[58] Field of Search ......... 364/200, 300, 900 MS File

[56] References Cited

U.S. PATENT DOCUMENTS

| 4,128,891 | 12/1978 | Lin et al. | 364/900 |
| 4,631,673 | 12/1986 | Haas et al. | 364/300 |
| 4,779,192 | 10/1988 | Torii et al. | 364/200 |
| 4,785,400 | 11/1988 | Kojima et al. | 364/200 |

Primary Examiner—Gareth D. Shaw
Assistant Examiner—Gopal C. Ray
Attorney, Agent, or Firm—Michael H. Shanahan

[57] ABSTRACT

Apparatus used in a relational data base system to maintain a dependence between a user-defined field in a row of one base table and the state of a set of rows in another base table. There are three kinds of dependent fields: a count field which contains a count of the rows in the set, a sum field which is the sum of a field in the rows of the set, and a base copy down field, which is a field in the rows of the set which contains a copy of a value in a field in the row of the one base table. The two base tables make up a referenced-referencing pair and the row from the one table has a primary key which is used as a foreign key in the set of rows of the other base table. The apparatus consists of components in the data dictionary which define the user-defined dependent field and the nature of the dependence, including any conditions thereon, and components in the data base system's run time system for maintaining the dependence. Each time the state of a row in the referencing base table is altered, the run time system uses the data dictionary to determine whether there is a user-defined dependent field, and if there is, what kind of dependent field it is. Code in the run time system then reestablishes the dependence as required for the altered row.

15 Claims, 14 Drawing Sheets

| | | |
|---|---|---|
| SDF DEF TY | 801 | ⎫ SF DEF KEY |
| SDF DEF ID | 803 | ⎬ 802 |
| CONN TY | | ⎫ CONN LOC |
| CONN ID | | ⎬ 805 |
| REFD FTY | | ⎫ REFD FD LOC |
| REFD FID | | ⎬ 807 |
| REFG FTY | | ⎫ REFG FD LOC |
| REFG FID | | ⎬ 809 |
| SBT DEF TY | | ⎫ REFG SBTD |
| SBT DEF ID | | ⎬ LOC 810 |
| COMP TYPE | 811 | |
| COND TEXT | 813 | |
| NCOND FLD | 815 | |
| COND F | 817 | |
| COND ERRC | 823 | |
| SDF DEF | 825 | |

SDF DEF 707

FIG. 8

```
Add Base Table
    Please fill in the requested information and press ENTER to Add the Table,
        or press another function key listed below.
    Table Name:     ............................      Definition locked? NO*
                                    ⎯907
    Add     Allowed?  YES ⎯909                                      ⎯911
    Modify  Allowed?  YES       Table Length:           0     ╱  bytes
    Delete  Allowed?  YES ⎯903  Estimated # of records: 100····

Update Exit:    ········    Table Security Class:    *   (Blank, A - Z,
    Default Exit:   ········                                  $ - Read Only,
                                                              # - Private )
    Comments:       ·············································
                    ·············································
                    ·············································       913
    ─────────────────────────────────────────────────────────────────
    ENTER) Add Table 2) Select File                                            13) Help 16) Cancel Add
```

901

```
Add Field - Basic Attributes
    Please fill in the requested information and press ENTER to Add the Field
    Field Name:     ························
                    ⎯917            ⎯915
    Usage:          CHAR**   (Char, Text, Number, Digits, Date, Time, Hex,
                    ⎯919      WPID, WPLIB, WP+ID, WP+LIB, Image, Phone)
    Length:         1·····   (Number of Characters or Digits)
    Decimals:       0··      (Number of Digits to Right of Decimal, for Numbers Only)
    Occurs:         1·····   (Number of Lines if Text Field)

Comments:       ·············································
                    ·············································
                    ·············································
    ─────────────────────────────────────────────────────────────────
    ENTER) Add Field
         Attributes                                           13) Help
    1) Basic              10) Add using Field Template
    2) Data / Visual      11) Add Duplicate Field             15) Manage Templates
    3) Storage                                                16) Done Adding
```

```
Pick Child Table
    Please position the cursor to select the Child Table in the Relationship,
              or press a Function Key below.
                                              Security Update  Default
            Table              Length Add Mod Del  Class   Exit    Exit
    * Customers                  153  YES YES YES
    * Departments                 65  YES YES YES
    * Employee Salary History     28  YES  NO YES         SALHIST
    * Employee Skills             10  YES YES YES
    * Employees                  108  YES YES YES
    * Help Text                  632  YES YES YES
    * Order Line Items            35  YES YES YES
    * Orders                      43  YES YES YES         UXORDERS  OXORDERS
    * Parts                      108  YES YES YES
    * Skills                     109  YES YES YES ENTER) Pick Child Table
1) Alt list
                                                13) Help
                    7) Find
                                                16) Return to Pick Parent Table
```

1003

```
Pick Parent Table
    Please position the cursor to select the Parent Table in the Relationship,
              or press a Function Key below.
                                              Security Update  Default
            Table              Length Add Mod Del  Class   Exit    Exit
    * Customers                  153  YES YES YES
    * Departments                 65  YES YES YES
    * Employee Salary History     28  YES  NO YES         SALHIST
    * Employee Skills             10  YES YES YES
    * Employees                  108  YES YES YES
    * Help Text                  632  YES YES YES
    * Order Line Items            35  YES YES YES
    * Orders                      43  YES YES YES         UXORDERS  OXORDERS
    * Parts                      108  YES YES YES
    * Skills                     109  YES YES YES ENTER) Pick Parent Table
1) Alt list
                                                13) Help
                    7) Find
                                                16) Cancel Create
```

Pick Parent Key

Please position the cursor to the Parent Key for the Relationship.
The Fields that make up the Key will be used to establish the Relationship.

Parent Table: Customers

| Name of Key | Index of Key | Storage Position | Length | Unique? | All Records? |
|---|---|---|---|---|---|
| * Primary Key Customer Number | PRIMARY | 1 | 6 | YES | YES |

↘ 1007

---

ENTER) Pick Parent Key

13) Help

11) Fields in Key

16) Return to Pick Table

1005

---

Add Relationship - Fields

Pick relationship fields by cursor position or X's and select a Function Key.
Parent Table: Customers
Child Table: Orders
Parent Key:   Primary Key Customer Number The Parent record is called:   Customers           'Ascend Name'
Child records are called:      Orders1             'Descend Name'

| Parent Field | Child Field | Parent Constant |
|---|---|---|
| * Customer Id | | NO |

↘ 1011        1013

---

ENTER) Continue Adding the Relationship
      6) Pick Child Field
      8) Remove Child Field from Rel    13) Help
    10) Validate Definition          14) Mark / Clear All
    11) Copy Child Field from Parent  16) Return / Cancel

```
Add Relationship - Attributes

Please modify the displayed information and press (ENTER),
                    or select a PF-key function below.
Parent Table: Customers
Child Table:  Orders
Parent Key:   Primary Key Customer Number         ___1017

The Parent record is called:   Customers······················  'Ascend Name'
Child records are called:      Orders1·····················     'Descend Name'

On Delete Parent, Children NOT ALLOWED (Not Allowed, Deleted, Nullified, OK)  ⎫
On Modify Parent, Children MODIFIED*** (Not Allowed, Modified, Nullified, OK) ⎬
Modify/Add Child requires NULL/PARENT  (Parent, Null/Parent, No Check, Insert)⎭
                                                                              1019
Comments:  ·············································
           ·············································
           ·············································

ENTER) Complete Relationship Add                          13) Help

16) Return / Cancel
```

```
| Modify Field - Data Attributes                                                        |
|                                                                                        |
| Please modify the displayed information and press ENTER to Modify the Field           |
|                                                                                        |
| Field Name:    Account Balance                                                        |
|                                                                                        |
|   Values:         ANY*********    (Any, Positive, NonNeg, Range, List, Coded)        |
|                      /1101                                                            |
|   Computation:    SUM*********    (None, RSN, Constant, Count, Sum, Exit, Formula,   |
|                                    BaseCopyDown, DateStamp, TimeStamp, IDStamp)      |
|   Stamp Option:   N/A*********    (Always, Insert Only)                              |
|                                                                                        |
|   Value User Alterable?  NO*                                                          |
|                                                                                        |
|   Null/Constant Value:  *****************************  (external format)             |
|   Is Null Value Valid?   YES                                                          |
|                                                                                        |
|   Table Identifying Field (TIF)?  NO*  (for Multi-Table Files)                       |
|                                                                                        |
| ENTER) Modify Field                                                                   |
|    Attributes                                                                         |
|  1) Basic                                                          13) Help          |
|  2) Data / Visual                                                                     |
|  3) Storage / Admin                                                16) Cancel/Modify |
```

1103

```
| Pick Table for Computation                                                            |
|                                                                                        |
|    Pick the table from which the computed field's value is to be derived             |
|                                                                                        |
| Computation:   SUM                                                                    |
|                                                                                        |
|                      Stored In                                                        |
| Field:         Account Balance                                                        |
| Table:         Customers  \___1105                                                    |
|                                                                                        |
|         Derived From Table          Is Called In Relationship                        |
| •  Orders \                           Orders \                                        |
|            1107                              1109                                     |
|                                                                                        |
|                                                                                        |
| ENTER) Pick Table for Computation                                                     |
|                                                                    13) Help          |
|                                                                    15) Display Relationship |
|                                                                    16) Cancel        |
```

```
!-----------------------------------------------------------------------
! Pick Field For Computation                                           !
! Only fields with (internal) usage type = NUMBER listed for selection. Y0670 !
!     Pick the field from which the computed field's value is to be derived. !
!                                                                      !
! Computation:    SUM                                                  !
!                                                                      !
!                      Stored In              Derived From             !
! Field:          Account Balance                                      !
! Table:          Customers                 Orders                     !
! Relationship:   Customer                  Orders                     !
!                                                                      !
!                                           Lines/ Parent/   Data      !
!     Derived From Field       Usage  Length Dec Occurs Child? Computation !
! * Order Number               NUMBER   4    0    1   Parent  RSN      !
! * Order Value                NUMBER  10    2    1           SUM      !
! * Count Items                NUMBER   3    0    1           COUNT    !
!  1114                                                                !
!                                                                      !
!                                                                      !
!                                                                      !
! ENTER) Accept Field                                  13) Help        !
!  1) Alt list                        7) Find         15) Display Field!
!                                                     16) Cancel       !
!-----------------------------------------------------------------------
 1113
```

```
!-----------------------------------------------------------------------
! Add Field Computation                                                !
!                                                                      !
! Computation:    'SUM                                                 !
!                                                                      !
!                      Stored In              Derived From             !
! Field:          Account Balance           Order Value                !
! Table:          Customers                 Orders                     !
! Relationship:   Customer    /1117         Orders                     !
!                                                                      !
! Condition:      Order-Status = "BOOKED"                              !
! (Optional)      ....................................................!
!                                                                      !
! (Use internal   ....................................................!
!  value for                                                           !
!  coded field)   ....................................................!
!                                                                      !
!                 ....................................................!
!                                                                      !
! ENTER) Add                                           13) Help        !
!                               10) Pick Field Name    14) Display Rel !
!  6) Add even if errors         / System Field        15) Display Derived!
!  7) Reselect Field / Table    11) Pick System Function   From Field  !
!                                                     16) Cancel       !
!-----------------------------------------------------------------------
```

FIG. 11A  1115

RELATIONAL DATABASE SYSTEM

CROSS-REFERENCE TO RELATED APPLICATIONS

The invention described herein is a further development of the relational data base system described in the following listed U.S. patent applications having Ser. Nos.: (a) 687,809 (now abandoned), filed Dec. 31, 1984; (b) 690,845, filed Jan. 11, 1985; (c) 171,232, filed Mar. 21, 1988, which is a continuation of U.S. Ser. No. 040,702 (now abandoned), filed Apr. 17, 1987, which in turn is a continuation of U.S. Ser. No. 690,844 (now abandoned), filed Jan. 11, 1985; (d) 172,992, filed Mar. 21, 1988, which is a continuation of U.S. Ser. No. 040,705 (now abandoned), filed Apr. 17, 1987, which in turn is a continuation of U.S. Ser. No. 691,036 (now abandoned), filed Jan. 11, 1985; (e) 171,231, filed Mar. 21, 1988, which is a continuation of 040,706, filed Apr. 17, 1987, which in turn is a continuation of 690,800 (now abandoned), filed Jan. 11, 1985.

BACKGROUND OF THE INVENTION

1. Field of the Invention

The invention relates to digital data processing systems and more particularly to relational data base systems.

2. Description of Related Art

Data base systems facilitate storage of and access to large numbers of data items. Generally, the data items are stored in fields in records and the data base is structured as a group of related sets of records. Often, a value in one set will be dependent on another set. For example, a single record in one of the sets will contain information about some or all of the records in another of the sets. When this is the case, the field is dependent on the state of the other set, and a change in that state should result in a change in the value of the field. Similarly, all of the records in a set may include a value obtained from a single record in another set; again, if the value in the single record changes, the values in the records in the other set should change.

In the prior art, such dependencies were generally dealt with by the programs which used the data base. The programmer who was working with a given set of records knew for example that there was a field in a record in another set whose value depended on the given set of records, and consequently, whenever he wrote a program which changed the given set, he made sure that the program also changed the record in the other set. There are several difficulties with this approach: first, the programmer and his successors must know that there is a field in one set dependent on another set; if that dependence is not documented, the program will not perform the update of the total number. Second, even if he does know of the dependence, he may forget to provide for it in a program, and the error will insure that the total number will occasionally fail to be updated. Third, even if the programmer never fails to include the update, the code will be repeated over and oven again and will be scattered throughout many programs, a situation which both wastes storage space and makes debugging or changing the update code extremely difficult.

The prior art has realized that dependencies between a value and a set were more properly dealt with in the definition of the data base than in the programs which used the data base, but has generally dealt with the problem in one of two fashions: it has either computed the value of the dependent field only once, namely at the time the record containing the field was created, or it has treated the dependent field as a virtual field and has recomputed its value each time the field is referenced. Both options are illustrated by the definitions in the CODASYL data definition language for SOURCE items and RESULT items, explained in T. William Olle, *The Codasyl Approach to Data Base Management*, John Wiley & Sons, New York, 1978, pp. 96-97, 106-107. The SOURCE item is a copy of an item in another set. When the ACTUAL option is specified, the copy is made when the record containing the SOURCE item is created; when the VIRTUAL option is specified, no actual copy is made and the value is fetched from the other set whenever the SOURCE item is read. Similarly, the RESULT item is defined as the result of the execution of a procedure on a set of records; when ACTUAL is specified, the copy is made when the record containing the RESULT item is created; when the VIRTUAL option is specified, the value is computed whenever the RESULT item is read.

Other data base systems have also used virtual fields where a result was computed or data required from another set of records. For example, in relational data bases, the data is presented to the user as two-dimensional tables. There are two kinds of tables: base tables, which actually contain the data items, and view tables, which are virtual tables made of fields from the base tables. View table field values may be the result of computation, or they may be from other tables, and thus may correspond to the CODASYL VIRTUAL SOURCE and RESULT fields.

While the virtual field approach assures that the data in a field is current, it has the great disadvantage of requiring the recomputation of a value each time the value is read. For example, if such a virtual field specifies the total monetary value of all the parts in a large set of parts records, the recomputation may involve fetching every part record.

A system which addresses the recomputation problem is described in Bernstein, Blaustein, and Clarke, "Fast Maintenance of Semantic Integrity Assertions Using Redundant Aggregate Data". Bernstein, et al. propose that consistency testing be done using aggregate data specifying information such as the current upper and lower bounds in the set. The aggregate data is updated each time a change is made in the set which affects the value of the aggregate data. While the system of Bernstein, et al. is useful for consistency checking, it does not address the more general problem of user-defined fields which are dependent from records in other sets of records. Another reference, Michael Hammer and Dennis McLeod, "Data Base Description with SDM, a Semantic Data Base Model", *ACM Transactions on Data Base Systems*, vol. 6, No. 3, September, 1981, pp. 351-386, gives an overview of a non-relational data base system which permits sets of information to be defined which contain values derived from other sets of information and indicates that copies of the derived values may be maintained in the data base. The reference does not, however, describe how these values are defined or maintained.

SUMMARY OF THE INVENTION

The present invention solves the problem of defining and correctly updating values in one set of rows which are dependent from the state of another set of rows in the context of a relational data base system which employs a data dictionary to define base tables. The apparatus of the invention maintains a dependence between a user-defined field in one base table of a relational data base system and the state of a row in another base table of the relational data base system when one of the base tables is a referencing base table and the other a referenced base table. The components of the apparatus include means in the data dictionary and dependence reestablishing means in the portion of the data base system which executes operations altering the state of a row. The means in the data dictionary define the dependence and the dependence reestablishing means respond to the means defining the dependence in the data dictionary by reestablishing the dependence according to the definition whenever a data base operation alters the state of the row. The alteration of the row's state may be a direct result of an operation on the row or an indirect result or side effect of an operation on another row. The definition of the dependence in the data dictionary may include a condition under which the dependence is to be redefined, and when that is the case, the dependence reestablishing means is responsive to the condition. Because the data dictionary is used at run time to determine whether one field is dependent on another and what the conditions of the dependence are, the definitions of the dependencies may be changed without changing the code that uses the data base.

Dependences which have been found advantageous in a presently preferred embodiment include a copy down field in rows of the referencing table and user defined aggregate fields in rows of the referenced table. The copy down field is a field which contains a copy of a value of a field in a row of the referenced table. There are two kinds of copy-down fields: if the copy-down field has the INITIAL attribute, its value is set when the row it belongs to is created and is not changed thereafter; if it has the MAINTAINED attribute, each time the value of the field changes in the referenced table row, the dependence reestablishing means examines the definition of the dependence in the data dictionary and copies the new value into the copydown fields of all of the rows in the referencing table.

The value of the aggregate field represents a characteristic of certain rows in the referencing table. Whenever the operation execution means performs an operation on a row in the referencing table which affects the characteristic, the dependence reestablishing means recomputes the aggregate field in the row of the referenced table. The recomputation of the aggregate field may be conditional upon an expression whose values may be fields in the row or system defined values. The aggregate values in the presently preferred embodiment include a count of the certain rows and a sum of the values of a field in the certain rows. Other embodiments may include other aggregate values such as the maximum or minimum of the values of a field in the set of rows in the child field or an average value.

It is thus an object of the invention to provide an improved relational data base system.

It is a further object of the invention to provide a relational data base system having a data definition system in which a user may define a field in the rows of one base table whose value is dependent on the state of the rows of another base table.

It is another object of the invention to provide a relational data base system in which the dependence between the field and the state of the rows includes a condition.

It is an additional object of the invention to provide a relational data base system in which a field may be defined in a referencing table whose value is always the same as that of a field in the referenced table.

It is a still further object of the invention to provide a relational data base system in which an aggregate field may defined in a referenced table whose value is determined by the referencing table.

It is yet another object of the invention to provide a relational data base system in which the aggregate field contains the sum of a set of fields in the referencing table.

It is an additional further object of the invention to provide a relational data base system in which the aggregate field contains a count of the number of certain rows in the referencing table.

Other objects and advantages of the present invention will be understood by those of ordinary skill in the art after referring to the detailed description of preferred embodiment contained herein and to the drawing, wherein:

BRIEF DESCRIPTION OF THE DRAWING

FIG. 8 is a detail of SDFDEF 707 in a preferred embodiment;

FIG. 9 shows screens used in a preferred embodiment to define a BT 101;

FIGS. 10, 10A and 10B show screens used to define a referenced referencing pair of BTs 101; and FIGS. 11 and 11A show screens used to define a SAF 105.

Figure 1:
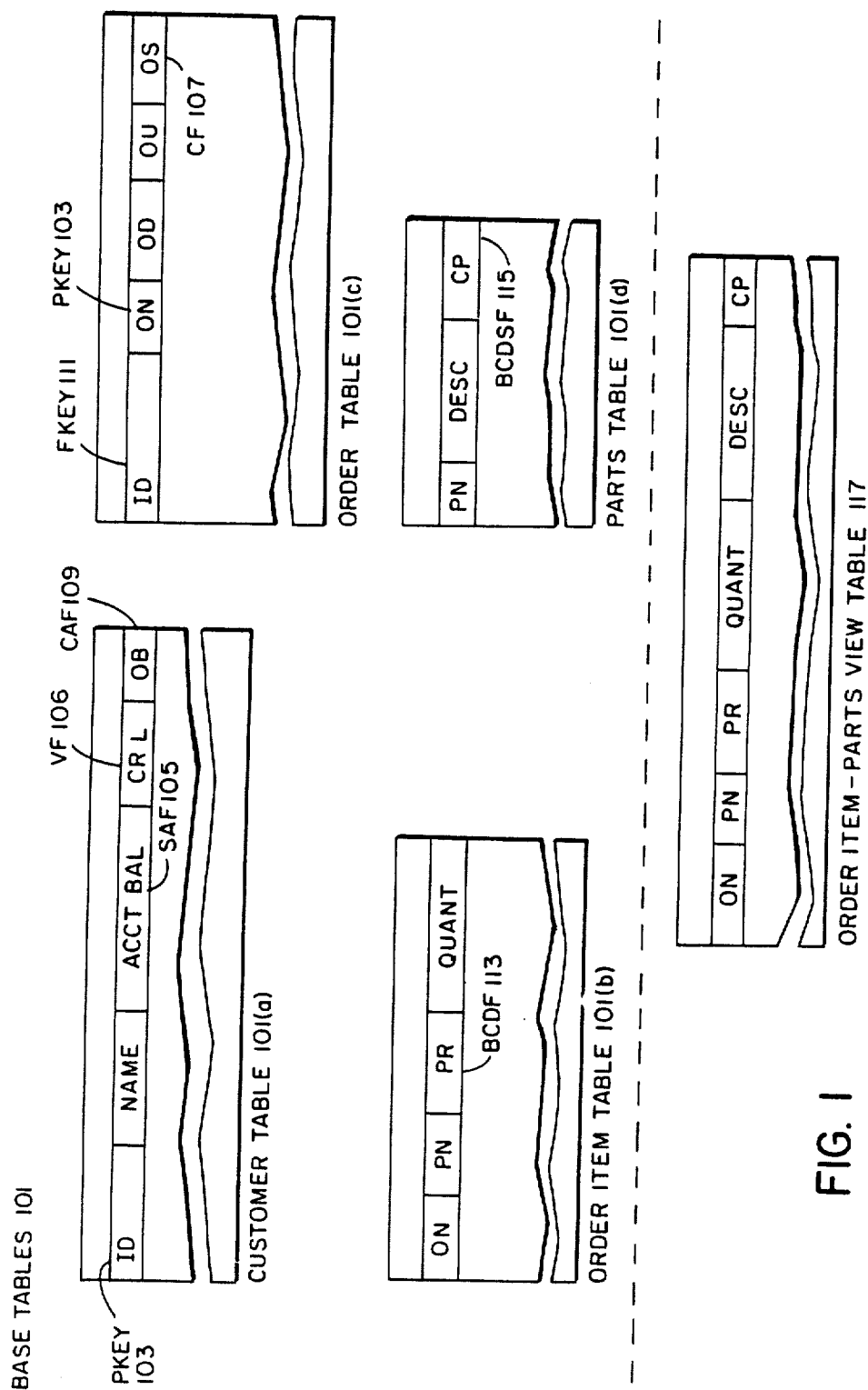
FIG. 1 is an example of a relational data base.

Reference numbers in the figures have three or more digits. The two least significant digits are reference numbers within a drawing; the more significant digits are the drawing number. For example, the reference number 103 refers to item 3 in drawing 1.

DESCRIPTION OF A PREFERRED EMBODIMENT

The following Description of a Preferred Embodiment of the invention will first describe relational data bases generally, will then proceed with an overview of a relational data base system which incorporates a preferred embodiment of the invention, an overview of the invention itself, a detailed discussion of the components and operation of the invention, and will close with a discussion of how the user defines the dependent fields of the invention.

1. Introduction to Relational Data Bases: FIG. 1

A relational data base is a data base in which sets of related items from the data base are treated logically as if they were contained in a two dimensional table. Each member of the set appears as a row in the table which contains the items in the member and the items in all of the rows are arranged as columns. For example, information about customers in the data base may be presented as shown in CUSTOMER TABLE 101(a) of FIG. 1. There, the items of information CUST ID (customer ID), NAME (customer name), ACCT BAL (account balance), CRL (credit limit), and OB (orders booked) are associated with each customer and appear in a row belonging to the customer in CUSTOMER TABLE 101(a). All of the CUST ID fields are arranged in a column, as are all of the NAME fields, and so forth.

In the relational data base system in which the invention is implemented, there are two kinds of tables: base tables, indicated in FIG. 1 with the reference number 101, and view tables, indicated with the reference number 117. A base table is a table whose rows actually exist as a set of records in storage such as a file to which the relational data base system has access. The items in the row are fields in the record for the row. A view table is a virtual table, i.e., one whose rows do not correspond to a set of records in a file, but is instead made up by the relational data base system from items from one or more base tables. For example, ORDER ITEM PARTS VIEW TABLE 117 contains items from ORDER ITEM TABLE 101(b) and PARTS TABLE 101(d).

Each row in a base table 101(x) must be uniquely identified by a primary key consisting of one or more fields. In base table 101(c), primary key (PKEY) 103 is the ON (order number) field. In addition, a row may contain fields which are a primary key in a different base table 101(y). Such fields are termed a foreign key. In base table 101(c), ID, which is a PKEY 103 in base table 101(a), is such a foreign key (FKEY) 111 When a base table 101(x) contains a foreign key, the base table 101(x) is said to reference base table 101(y). Base table 101(x) is then termed a referencing base table 101 and base table 101(y) a referenced base table 101. Thus, base table 101(c) is a referencing table with regard to base table 101(a) and base table 101(a) a referenced table with regard to base table 101(c). Of course, a base table 101 may simultaneously be a referenced table and a referencing table, and may reference and be referenced by more than one other base table 101. For example, base table 101(c) references base table 101(a) and is referenced by base table 101(b), which also references base table 101(c). Moreover, a base table 101 may even have itself as a referencing base table 101.

Since pairs of referencing and referenced base tables 101 are dependent on each other, an alteration of a key in a row in one of the pairs or the addition or deletion of a row from one of the pairs may imply a change in the other of the pairs. For example, if a row in a referenced base table 101 is deleted, the rows in referencing base table 101 which included a FKEY 111 from the deleted row become "orphans", i.e., rows for which there is no row in the referenced base table 101 which has that FKEY 111 as its PKEY 103. Similarly, if a row is added to referencing base table 101 whose FKEY 111 is not the PKEY 103 of any row in the referenced base table 101, the added row is an orphan. As may be seen from the preceding discussion, the change of a PKEY 103 in a row of referenced table 101 or of a FKEY 111 in a row of referencing table 101 may similarly produce orphans.

Figure 2:
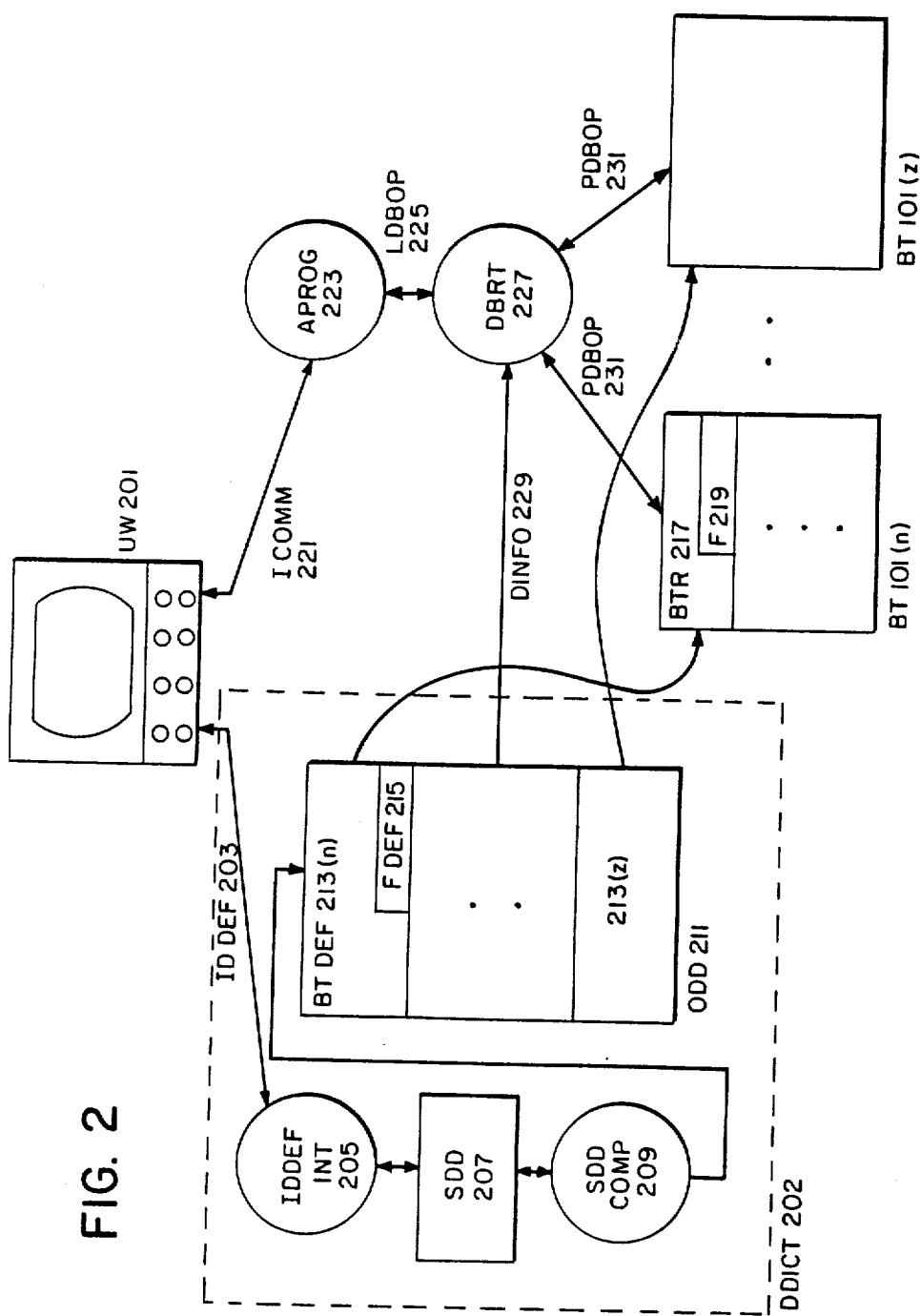
FIG. 2 is an overview of a relational data base system in which the present invention may be employed.

2. Overview of the Relational Data Base System in which the Invention is Embodied: FIG. 2

The present invention is embodied in the Professional Application Creation Environment (PACE) relational data base system manufactured and sold by Wang Laboratories, Inc. for use on its VS line of computers. The PACE relational data base syste is described in detail in manuals which are available to the public from Wang Laboratories, Inc. The manuals are the following:

*VS Introduction to the Professional Application Creation Environment (PACE)*
*VS Professional Application Creation Environment (PACE) Dictionary Reference*
*VS Professional Application Creation Environment (PACE) COBOL Host Language Interface (HLI) Reference*

These manuals are hereby incorporated by reference in the present application.

An overview of the PACE relational data base system is provided by FIG. 2. In that figure, executable code is indicated by circles and data structures by rectangles. Arrows consisting of straight lines indicate data flows and curved arrows represent location information such as pointers. The main components of the system include user work station (UW) 201, data dictionary (DDICT) 202, application program (APROG) 223, data base run time programs (DBRT) 227, and a number of base tables (BT) 101(n . . . z). UW 201 is a workstation such as a terminal, intelligent terminal, or personal computer by means of which users of the relational data base system interact with the VS computer system on which PACE is implemented and with the relational data base system itself. DDICT 202 describes relational data base accessed by the relational data base system. APROG 223 is an application program which is performing logical operations (LDBOP) 225 on the data base described in DDICT 202. APROG 223 may operate in batch mode, but is generally controlled interactively by interactive commands (ICOMM) 221 from UW 201 and returns data to UW 201. In a preferred embodiment, the interaction is generally by means of screens on UW 201. LDPOPs 225 read, update, insert, or delete information in the data base. DBRT 227 is a set of programs provided by the data base system. The programs respond to the LDBOPs 225 by carrying out physical data base operations (PDBOPs) 231 on fields (F) 219 in records (BTRs) 217 in BTs 101 using information about the data base (DINFO) 229 obtained from DDICT 202.

Continuing with details of FIG. 2, the components of DDICT 202 are the following: Interactive data definition interpreter (IDDEF INT) 205 is an interpreter program which receives an interactive data definition (IDDEF) 203 from UW 201 which defines a table in the relational data base. In a preferred embodiment, the user of UW 201 provides the definition by filling in fields in a sequence of screens on UW 201; in other embodiments, the user may provide input from UW 201 via a command line or even specify a file which contains IDDEF 203. IDDEF INT 205 responds to IDDEF 203 by producing a table definition in source data dictionary (SDD) 207. The definition in SDD 207 is complete logical specification of the table, but is not yet in a form which permits rapid access of the specification by DBRT 227. To produce this form, SDD 207 is compiled by SDD compiler 209 to produce object data definition (ODD) 211. In overview, ODD 211 is a set of base table definitions (BTDEF) 213, and view table definitions (not shown), one for each BT 101 and view table 117 in the data base. Each BTDEF 213 includes field definitions (FDEF) 215 defining the fields F 219 in the BTRs 217 making up BT 101 defined in BTDEF 213, and also contains location information by means of which DBRT 227 can locate the file containing the corresponding BT 101. The view table definitions counting references to the BTDEFs 213 for the BTs 101 containing the fields displayed in the view table 117. In the relational data base system of the preferred embodiment, SDD 207 and ODD 211 are themselves maintained as data bases by the relational data base system.

Operation of the relational data base system of FIG. 2 has two phases: defining the data base and operating on the data base. The data base is defined by means of operations which create and modify DDICT 202. The operations specify each base or view table and each field of the records contained therein by name and further specify which of the fields are to serve as keys. If a table is being created or modified, IDDEF INT 205 provides screens to the user of UW 201 which obtain the information which IDDEF INT 205 needs to create or modify the table definition in SDD 207. If there is already a partial definition, the screens provide information from SDD 207 by means of which the user can determine the properties of the partially defined table and ensure that the further definition of the table will be consistent with what has gone before. IDDEF INT 205 further uses the information in SDD 207 to determine whether additions to a table definition are consistent with what has gone before. When it is not, IDDEF INT 205 provides error messages to UW 201. When a user has finished creating or modifying table definitions in DDICT 202, IDDEF INT 205 validates the added material in SDD 207 by checking it for consistency with the material previously contained in SDD 207. If inconsistencies are found, error messages are returned to UW 201. When there are no remaining inconsistencies, the user may compile SDD 207 using SDD COMP 209 to produce ODD 211 corresponding to the latest revision of SDD 207 and ending the definition phase.

The operations which a user may perform on a data base include reading base or view tables, modifying fields in base or view fields, inserting rows in BTs 101, and deleting rows in BTs 101. When a field in a row is modified, F 219 in BTR 217 which contains the data for the field is modified; when a row is inserted, a BTR 217 is added to BT 101; when a row is deleted, a BTR 217 is deleted from BT 101. As previously indicated, a user specifies to APROG 223 what operation is to be performed, perhaps via a screen in UW 201, and APROG 223 responds to the user specification by providing a logical data base operation (LDBOP) 225 to DBRT 227. LDBOP 225 specifies a field by specifying the base table 101 or view table 117 containing the table, a key for the table row, and the name of the field in the row. In response to LDBOP 225, DBRT 227 locates BTDEFs 213 and FDEFs 215 for BTs 101 and Fs 219 containing the information to be read or altered. From BTEDF 213, DBRT 227 can locate BT 101, by means of the key, DBRT 227 can locate BTR 217 containing F 219, and by means of FDEF 215, DBRT 227 can locate F 219 in that BTR 217. DBRT 227 then performs physical data base operations on F 219 as required by LDBOP 225. Similarly, on a delete operation, LDBOP 225 specifies the name of BT 101 and a key, and DBRT 227 obtains the location of BT 101 from BTDEF 213 and then deletes BTR 217 specified by the key. On an insert operation, LDBOP 225 specifies BT 101 and the contents of the new BRT 217, and DBRT 227 locates BT 101 from BTDEF 213, makes a new BRT 217 in BT 101, and adds the field specified in BTDEF 213 as the key to the index of keys.

As pointed out in the general discussion of relational data bases, where two BTs 101 are a referenced referencing pair, a change of key values in a row belonging to one of the BTs 101 or an addition or deletion of such a row may imply changes in the other BT 101. If the changes are not made, the referencing BT 101 will contain "orphan" rows. In the PACE relational data base system, referenced referencing pairs of BTs 101 and their PKEY 103 and FKEY 111 fields are defined by the user for SDD 207 When the user defines such a pair, he may also define how the PACE system deals with such changes when they result from the deletion of a row in a referenced BT 101, from the modification of such a row, and from the modification or addition of a row in a referencing BT 101. In each of the above cases, the user has the following options:

Deletion of a row in a referenced BT 101: The user may specify that a deletion which produces orphan rows is not allowed, that any resulting orphan rows be deleted, that the FKEY 111 field in an resulting orphan rows be set to a null value, or that the resulting orphan rows be left unchanged.

Modification of a row in a referenced BT 101: The user may specify that a modification which produces orphan rows is not allowed, that the FKEYS 111 in the orphan rows be modified to agree with the modified key of the modified record, that the FKEY 111 field in the orphans be set to a null value, or that the orphans be left unchanged.

Modification or addition of a row in a referencing BT 101: The user may specify that a modification or addition which produces an orphan is not allowed, that the row may be modified or added, but that its FKEY 111 field will be set to a null value, that the row may be added as it is, or that a record be created in the referenced BT 101 for the modified or added row which has the modified or added row's FKEY 111 as its PKEY 103.

Since a BT 101 may be both a referenced and a referencing BT 101, it is apparent that a specification that orphan rows be deleted can result in a cascade of deletions and that a specification that a row be inserted in a referenced table BT 101 to prevent creation of an orphan can result in a cascade of insertions.

3. Dependent Fields in Relational Data Bases Incorporating the Present Invention: FIG. 1

In the relational data base system employing the present invention, the value of a certain field in a row in one of a pair of referenced and referencing base tables may be dependent on the state of certain records in the other of the pair of base tables. In a presently-preferred embodiment, there are two classes of such dependencies:

The value of an aggregate field in a row of a referenced base table may depend on the state of certain rows of a referencing base table.

The value of a base copy down field in certain rows of the records of referencing base table may depend on the value of a source field in a row of the referenced table.

Fields in the base tables 101 of FIG. 1 provide examples of both aggregate fields and base copy down fields.

In the presently-preferred embodiment, there are two kinds of aggregate fields: a count field, whose value is the number of the certain rows, and a sum field, whose value is the sum of the values of a certain field contained in the certain rows. The OB field in a given row of table 101(a) of FIG. 1 is an example of a count aggregate field (CAF) 109. The OB field contains the number of rows in ORDER TABLE 101(c) in which the value of the ID field is the same as that of the same field in the given row of CUSTOMER TABLE 101(a) and the value of the OS (order status) field is the code for BOOKED. The OS field is thus a condition field (CF) 107 for the OB field. Whether a given row of ORDER TABLE 101(c) is included in the computation of OB depends on the value of the OS field. Each time a data base operation results in a change to any of the rows in BT 101(c), all of the aggregate values which involve fields in the row are recomputed. Thus, the current value of OB always indicates how many rows having the same ID value as the given row of CUSTOMER TABLE 101(a) presently have the BOOKED status.

The ACCT BAL (account balance) field of the given row of table 101(a) is an example of sum aggregate field (SAF) 105. ACCT BAL's value is the sum of the OV (order value) fields in those rows of ORDER TABLE 101(c) whose ID field has the same value as the ID field of the given row of CUSTOMER TABLE. A row of ORDER TABLE 101(c) remains in the table from the time the order is made until the time the customer pays for the order. Consequently, each time a row whose ID field has the same value as the ID field in the given row is added to ORDER TABLE and each time such a row is deleted from the table, ACCT BAL in the given row must be recomputed.

The PR (price) field of ORDER ITEM TABLE 101(b) is an example of a base copy down field (BCDF) 113. ORDER ITEM TABLE 101(b) references PARTS TABLE 101(d) in that the PN field of a row in table 101(b) is the primary key of a row in table 101(d). The value of the PR field in a given row of table 101(b) is a copy of the value of the CP (current price) field in the row of table 101(d) whose PN field has the same value as the corresponding field in the given row of table 101(b). The CP field is thus a base copy down source field (BCDSF) 115. When PR is copied from CP depends on whether PR has the INITIAL or MAINTAINED attribute. In the former case, PR is copied only once, namely when the row contained PR is created. In the latter case, whenever a data base operation changes the value of CP, the new value must be copied into the PR fields of all of the rows in table 101(b) whose PN fields have the same value as the PN field of the given row of PARTS TABLE 101(d).

A BCDF 113 is particularly useful when the row contains a formula field, i.e., a field whose value is arrived at by performing an arithmetic operation involving one or more other fields of the record. For example, a TOTAL PRICE field might be added to table 101(b) which is defined as PR * QUANT (quantity ordered), i.e., the current price times the number ordered. This computation is performed each time a data base operation changes the value of either of the specified fields. Consequently, if PR was defined to change its value whenever its BCDSF 115 did, the computation would occur as a side effect of a change in the value of the CP field in the given row of PARTS TABLE 101(d). Further, if TOTAL PRICE were a field used to produce a sum in a SAF 105, the change in value of TOTAL PRICE would result in a recomputation of SF 105.

In another feature of the present invention, a validation condition may be defined which checks whether other fields in a row or system values have the proper values before a row is updated. An example of such a validation condition is provided by the relationship between ACCT BAL and the CR L (credit limit) fields of the rows in CUSTOMER TABLE 101(a). CR L is a validation field (VF) 106 for ACCT BAL. Each time ACCT BAL in a given row increases because a new row has been added to ORDER TABLE 101(c), the new account balance is compared with the value of CR L. in that row. If the new balance is larger than CR L, ACCT BAL is not updated and the new row is not added to ORDER TABLE 101(c).

Figure 3:
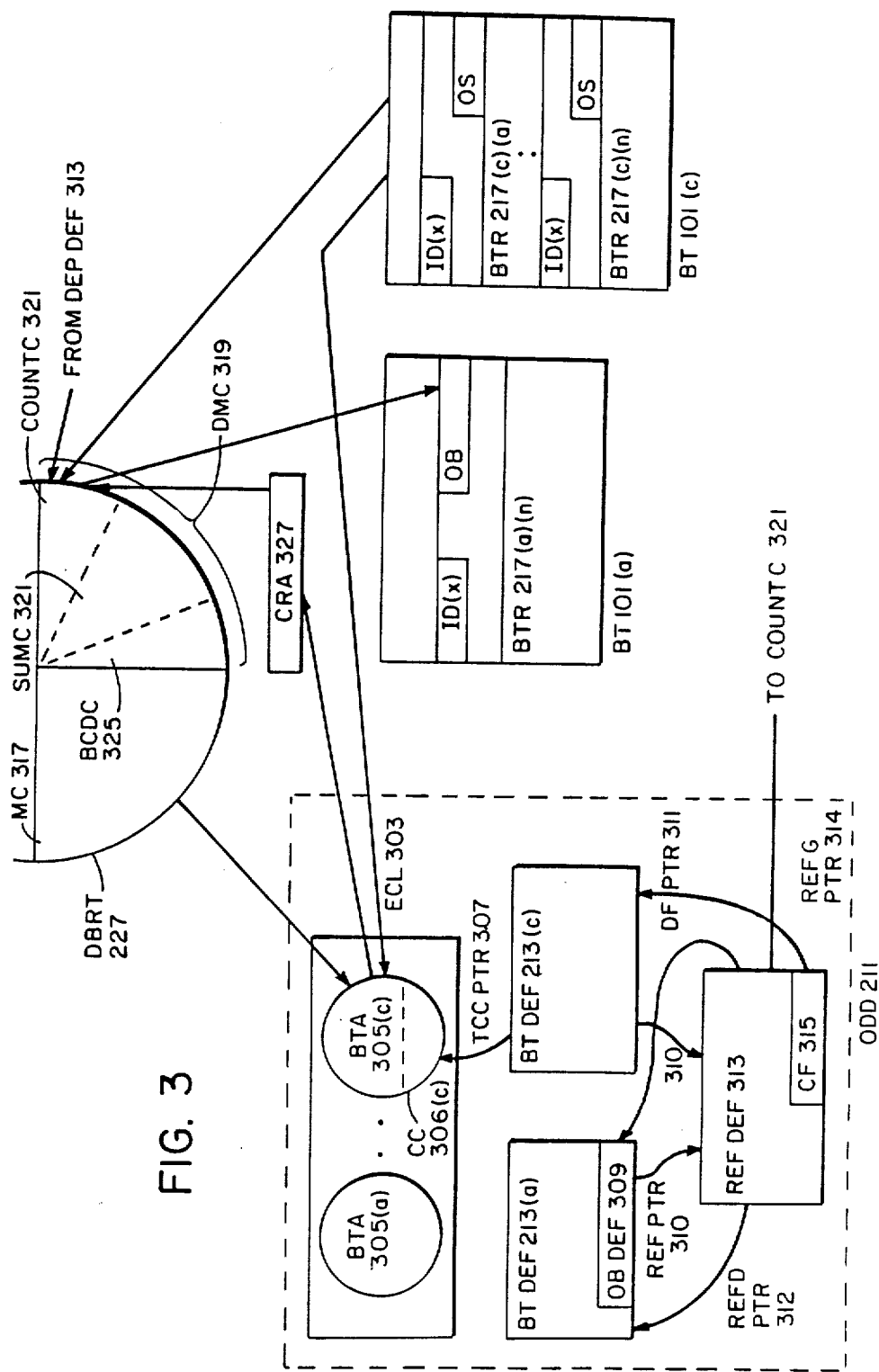
FIG. 3 is an overview of the dependence maintaining apparatus of the present invention.

4. Overview of the Dependency Maintaining Apparatus of the Present Invention: FIG. 3

The dependencies between a field of one of a pair of referenced or referencing tables and the state of records in the other of the pair are maintained by dependence maintaining apparatus 301, shown in FIG. 3. As may be seen from that figure, apparatus 301 consists of additional components in ODD 211 and DBRT 227 of the relational data base system of FIG. 2. As in FIG. 2, rectangles represent data structures, circles represent executable code, curved arrows represent location information, and arrows made up of straight lines represent data flows. For the sake of clarity, FIG. 3 shows the invention as it is used for only one of the dependencies shown in FIG. 1, namely that between the count aggregate field 107 OB of CUSTOMER TABLE 101(a) and rows in ORDER TABLE 101(c). As previously explained, that dependency is further conditional on the value of the OS field in the relevant rows of ORDER TABLE 101(c). The dependency is shown in FIG. 3 as BTR 217(a) (n) representing a row of CUSTOMER TABLE 101(c) whose ID field has a value represented by ID(x) and the set of BTRs 217(c)(a . . n) representing the rows of ORDER TABLE 101(c) whose ID fields have the value ID(x).

Beginning the discussion of the overview of FIG. 3 with ODD 211, when a pair of base tables (BTs) 101 are referenced and referencing, the BTDEF 213 for each of the base tables contains a pointer (REFPTR) 310 to a reference defining data structure (REFDEF) 313 which contains data defining the referencing-referenced relationship. There is one such REFDEF 313 for every PKEY 103 of the referenced BT 101 used as a FKEY 111 in the referencing BT 101. In a preferred embodiment, REFDEF 313 includes data indicating the following:

- which fields in referencing BT 101 serve as PKEY 103;
- how the relevant rows in a referencing table which include a key from a row in the referenced table are to be treated if the row with the key is deleted;
- whether a row is to be added in the referenced table if a row is added to the referencing table which has a new key for the referenced table;
- whether the reference includes aggregate fields and base copy down fields, and if it does, pointers (DFPTR 311) to the FDEFs 215 for those fields in the BTDEFs 213 for the pair of referenced referencing BTs 101 and indications whether the computation of the aggregate is conditional and whether the base copy down fields ar maintained.

REFDEF 313 also includes REFDPTR 312, which points to BTDEF 213 for the referenced BT 101, and REFGPTR 314, which points to BTDEF 213 for the referencing BT 101.

As already indicated, the inclusion of a value in an aggregation may be conditional. The specification of a condition for inclusion in an aggregate value is a special case of a general feature of the relational data base system of the present invention: when a user defines a base table, he may also define actions to be taken when a record in the table is added, deleted, or modified. In addition to the conditional computation of an aggregate field, the actions which a user may specify in a presently-preferred embodiment include:

- the computation of a field in the row being modified according to a user-defined formula involving other fields in the row and system provided functions and values.
- a validation condition based on fields within the row and system provided functions and values which is tested before a new or modified record is stored. If the condition fails, the user may specify that the data base system take one of a set of system-defined actions;
- a table exit action which is taken on exit from a BT 101 after any row in a BT 101 is added, deleted, or modified; and
- a default action which is taken when the relational data base system initializes a new row. The new row need not be added to the BT 101.

The executable code which performs these actions is contained in executable code library (ECL) 303 in ODD 211. ECL 303 is a shared subroutine library. There is one ECL 303 per data base, and each BT 101 for which an action is defined has a base table action section (BTA) 305 within ECL 303. Indexes in each BTDEF 213 for which one or more such action is defined permit location of the code for the action in BTA 305. In FIG. 3, only the index for the condition code for the incrementing of the OB field is shown. It appears as table condition code pointer (TCCPTR) 307, pointing to the condition code portion (CC) 306(c) of BTA 305(c). The code in CC 306 includes code executed when the value of an aggregate field is recomputed, code executed when the value of a field is computed, and code executed when a validation condition is tested. In a presently-preferred embodiment, the code in ECL 303 is produced by a COBOL compiler. In the case of aggregate field conditions, formulas for computed fields, and validation conditions, the code is produced from information in SDD 207; in the case of the user defined table exit actions and default actions, the user defining the action provides the COBOL code to be compiled. The execution of the condition code will be discussed in the following as an example of the general manner in which user-defined actions are executed.

As previously indicated, FIG. 3 shows the components described above only as they relate to the OB field of CUSTOMER TABLE 101(a). Thus, there are two BTDEFs 213: BTDEF 213(a), corresponding to CUSTOMER TABLE BT 101(a), and BTDEF 213(c), corresponding to ORDER TABLE 101(c). Since BT 101(c) references BT 101(a), there is in each of the two BTDEFs 213, a REFPTR 310 to REFDEF 313 for the referenced-referencing pair. REFDEF 313 includes DFPTR 311 locating OBDEF 309, the FDEF 215 for the OB field, in BTDEF 213, and a condition flag (CF) 315 indicating that the dependence is conditional. Because the dependence is conditional. BTDEF 213(a) further contains TCCPTR 307 locating the code in BTA 305(a) for the condition. If the dependence had involved fields of both the referencing and the referenced BT 101, REFDEF 313 would additionally have included a DFPTR 311 locating the relevant field in BTDEF 213(c). Similarly, if a condition had involved BT 101(c), there would be a TCCPTR 307 from BTDEF 213(c) to BTA 305(c).

The remaining components of Apparatus 301 belong to DBRT 227. Within DBRT 227, there is modification code (MC) 317 which is executed whenever a row of a BT 101 is added, deleted, or modified. Included in that code is dependence maintenance code (DMC) 319, which in a presently preferred embodiment has three parts: count code (COUNTC) 321, which updates count aggregate fields 107, sum code (SUMC) 323, which updates sum aggregate fields 105, and base copy down code (BCDC) 325, which sets and maintains base copy down fields 113.

Communication between condition code in CCs 306 and COUNTC 321 and SUMC 323 in a preferred embodiment is by means of a variable, condition result array (CRA) 327. CRA 327 is a bit array with one bit corresponding to the code for each condition in ECL 303. The value of the bit indicates the result of the execution of the condition code. CRA 327 is used as follows: at the beginning of any operation which modifies a row MVC 317 initializes CRA 327 by setting all of the bits to one value. Then, MVC 317 executes the code defined in CC 306 for the BT 101 using the unmodified fields of the row. As a result of the execution, the relevant bits are set in CRA 327. MVC 317 makes a copy of CRA 327, performs the modification, and again executes the code in CC 306. COUNTC 321 or SUMC 323, as the case may be, compares the current and former values of CRA 327 to determine whether the aggregate field in the referencing record is to be increased, decreased, or left unchanged. In the case of a CAF 109, CAF 109 is simply incremented or decremented; in the case of a SAF field 105, SAF field 105 is incremented or decremented by the difference between the new value and the former value of the field in the row of the referencing BT 101. As can be seen by the foregoing description, it is generally not necessary to read all of the rows in the referencing BT 101 which are dependent on the row of the referenced BT 101 to update the aggregate field. All of the dependent rows are read only when the row they are dependent on is a new addition to referenced BT 101.

5. Operation of the Present Invention: FIG. 3

As previously indicated, the OB field of a row in CUSTOMER TABLE 101(a) is a count aggregate field 109 which indicates for a given row (identified for this discussion by the value ID(x) in the ID field) the number of rows in ORDER TABLE 101(c) which have the same value ID(x) in their ID fields and whose OS fields indicate the status BOOKED. Consequently, the OB field must be updated each time a row is added with the status BOOKED, each time the status of one of the relevant rows changes to BOOKED or from BOOKED and each time a relevant row with the status BOOKED is deleted.

The invention operates in a preferred embodiment as follows to bring about the above result: Whenever MC 317 creates, deletes, or modifies a record in BT 101(c), it determines from BTDEF 213(c) for BT 101(c)

whether BT 101(c) is either referenced or referencing. If it is, MC 317 uses REFPTR 310 to locate each of the REFDEFs 313 associated with BTDEF 213(c) and determines from those REFDEFs 313 what other BTs 101 are affected by a change in BT 101(c). For each of the BTs 101, MC 317 then carries out the actions required by the dependencies specified in the REFDEFs 313.

The example REFDEF 313 of FIG. 3 specifies among other things that there is a CAF 109 field in BT 101(a) and provides in REFGPTR 314 the information which MC 317 needs to locate BTDEF 213(c). In the case of modifications, MC 317 first executes the condition code in CC 306 on the unmodified row, saves a copy of CRA 327 resulting from the execution, modifies the existing row, and reexecutes the condition code. Then COUNTC 321 determines by comparing the copy of CRA 327 with its current value whether it is necessary to increment or decrement the OB field. If it is, COUNTC uses ID(x) to locate the proper record in BT 101(a) and sets the OB field to its new value.

The other operations involving dependencies are similar. Where the referenced BT 101 has a sum aggregate field (SAF) 105 in a given row which is the sum of fields in rows of a referencing BT 101, REFDEF 313 contains DFPTRs 311 to the relevant FDEFs 215 in both BTDEFs 213. Whenever a row in a referencing BT 101 is inserted, deleted, or modified, MC 317 determines from REFDEF 313 whether there is a SAF 105 dependent from the row. If there is, MC 317 calls SUMC 323, which determines whether SAF 105 must be increased or decreased from CRA 327 and its copy and determines the amount of increase or decrease by comparing the new value of the field with its former value. SUMC 323 then uses the key in the row to locate the row containing the SAF 105 and sets the SAF 105 as required by the increase or decrease.

Where the referencing BT 101 has a base copy down field (BCDF) 113, REFDEF 313 contains pointers to FDEF 215 for BCDF 113 in the BTDEF 213 corresponding to the referencing BT 101 and to FDEF 215 for base copy down source field (BCDSF) 115 in the BTDEF 213 corresponding to the referenced BT 101. REFDEF 313 further contains a flag for each BCDF 113 which indicates whether the BCDF 113 is maintained. Whenever MC 317 adds a new record to a referencing BT 101, it determines from REFDEF 313 whether referencing BT 101 includes a BCDF 113. If it does, MC 317 executes BCDC 325, which uses REFDEF 313 to locate FDEF 217 for BCDSF 115 and the information from FDEF 217 and the foreign key in the new record to locate the proper row of the referenced BT 101. BCDC 225 then copies the value of BCDSF 115 in that row into BCDF 113 in the new row of the referencing BT 101.

Further, each time MC 317 alters a row in a referenced BT 101, it determines from REFDEF 313 whether the row includes a BCDSF 115. If it does, and if the alteration affects the value of BCDSF 115, MC 317 determines from REFDEF 313 whether the BCDFs 113 dependent from BCDSF 113 have the INITIAL or MAINTAINED attribute. In the latter case, MC 317 executes BCDC 325, which uses the information in FDEF 215 and the row of the referenced BT 101 to locate all of the rows in the referenced BT 101 which are dependent from the BCDSF 115 in the row being altered. For each of those rows, BCDC 325 copies the new value of BCDSF 115 into BCDF 113. If the BCDF 113 whose value changed affects the value of an aggregate field, the value of the aggregate field is recomputed as previously described.

Of course, the change in value of an aggregate field or a base copy down field as a result of the computations just described may itself result in further changes in value. For example, if a row in one BT 101 contains a SAF 105 and the inclusion of the row in a CAF 109 maintained in a row of another BT 101 is conditional upon the value of the SAF 105, then a recomputation of the SAF 105 may result in a recomputation of the CAF 109. Recomputations may further result from the creation of orphan rows. When orphans are created, the aggregate fields in any affected rows in BTs 101 referenced by the BT 101 in which the orphans were created are recomputed by SUMC 323 or COUNTC 321, depending on the kind of aqgregate fields. If the orphans have BCDFs 113 for which the MAINTAINED attribute was specified, the BCDFs are set to a null value. When rows are deleted from the referencing BT 101, the aggregate fields in rows of the referenced BT 101 are recomputed as indicated above. When a row is inserted in the referenced BT 101, any aggregate fields dependent on the row are recomputed; if the inserted row has a BCDSF 115, that field is set to a null value and the BCDFs 113 in the rows in the referencing table which are dependent on BCDSF 115 and have the MAINTAINED attribute are set to the null value.

Figure 4:
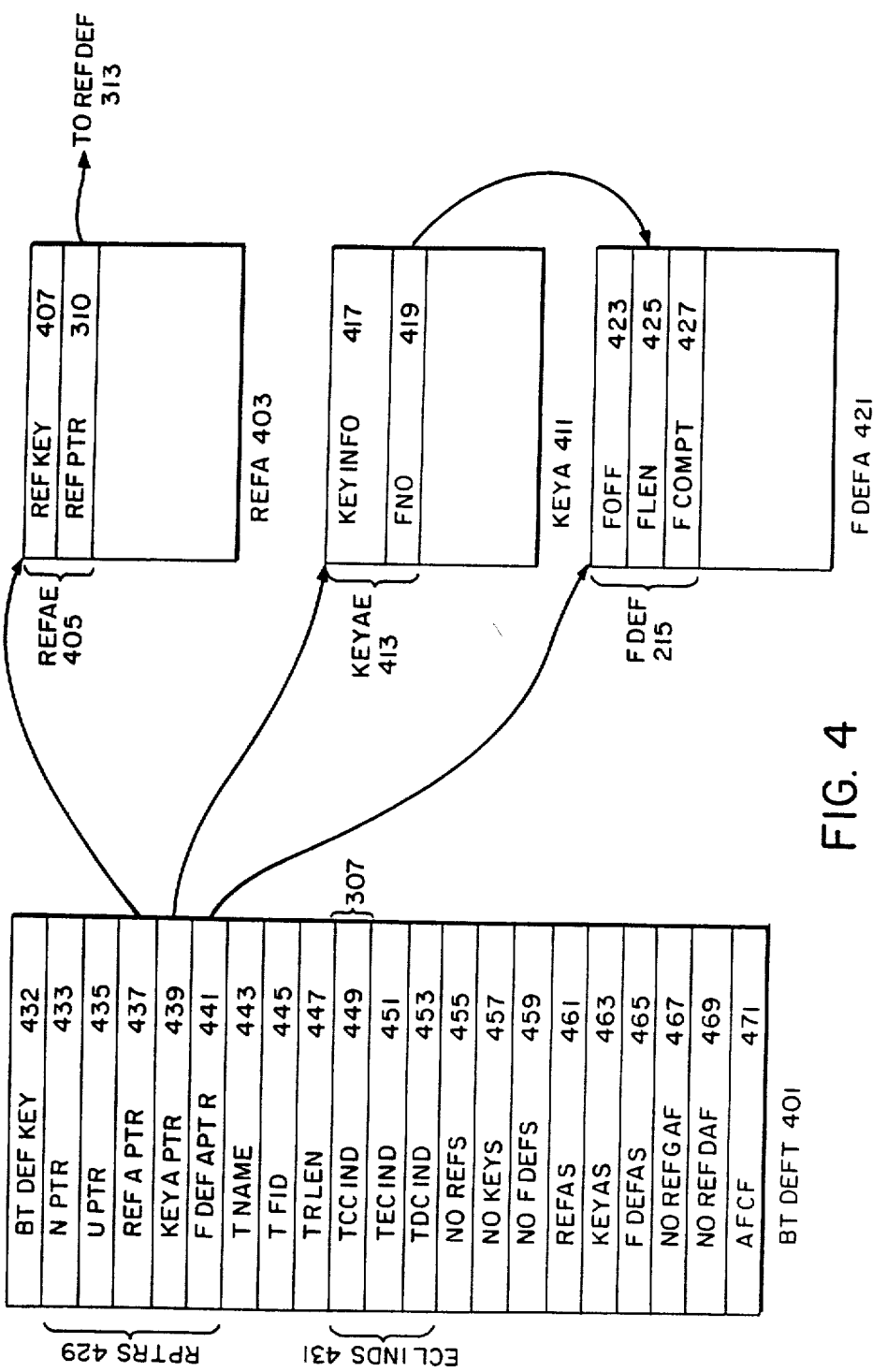
FIG. 4 is a detail of BTDEF 213 in a preferred embodiment.
Figure 5:
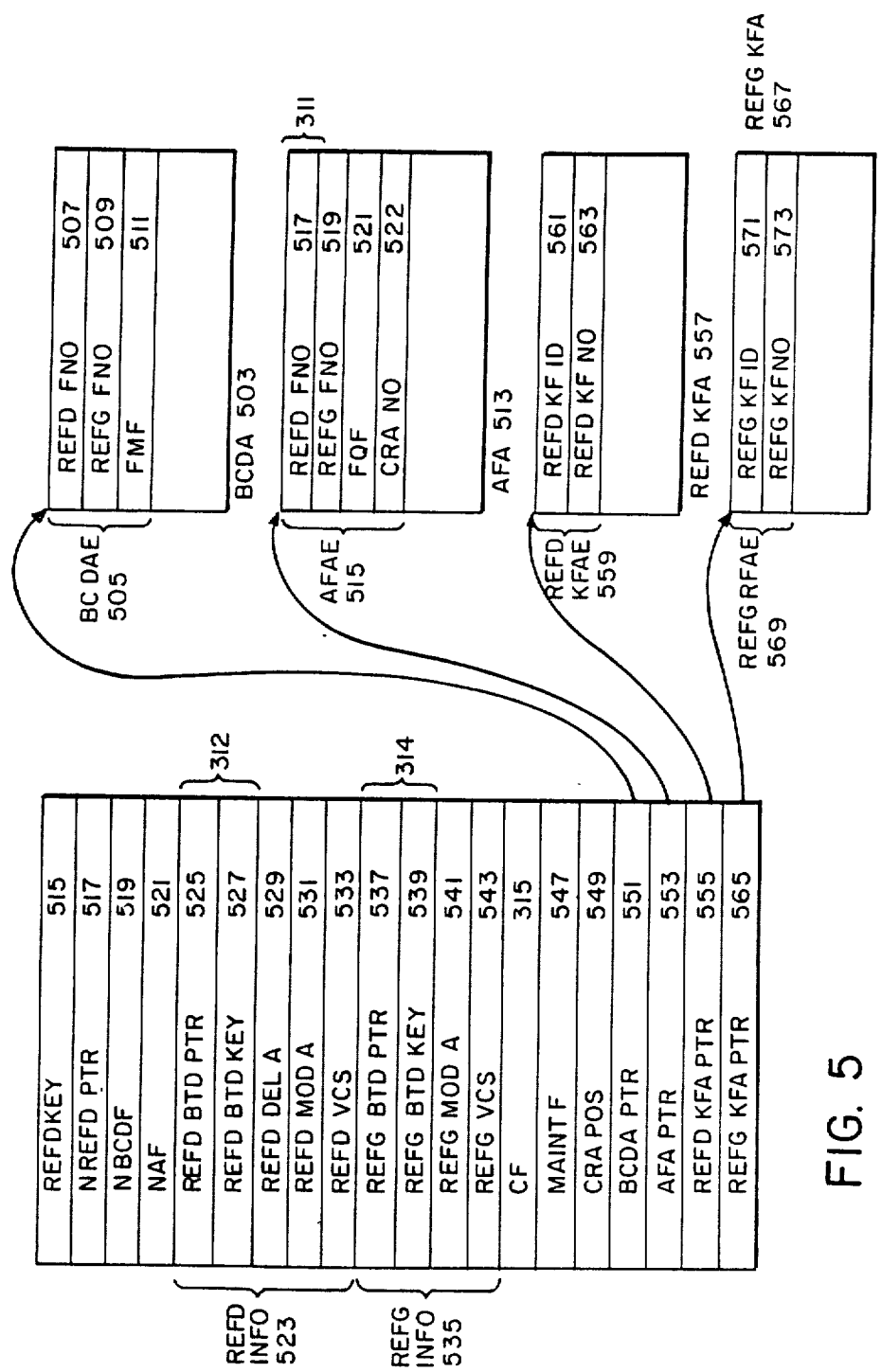
FIG. 5 is a detail of REFDEF 313 in a preferred embodiment.
Figure 6:
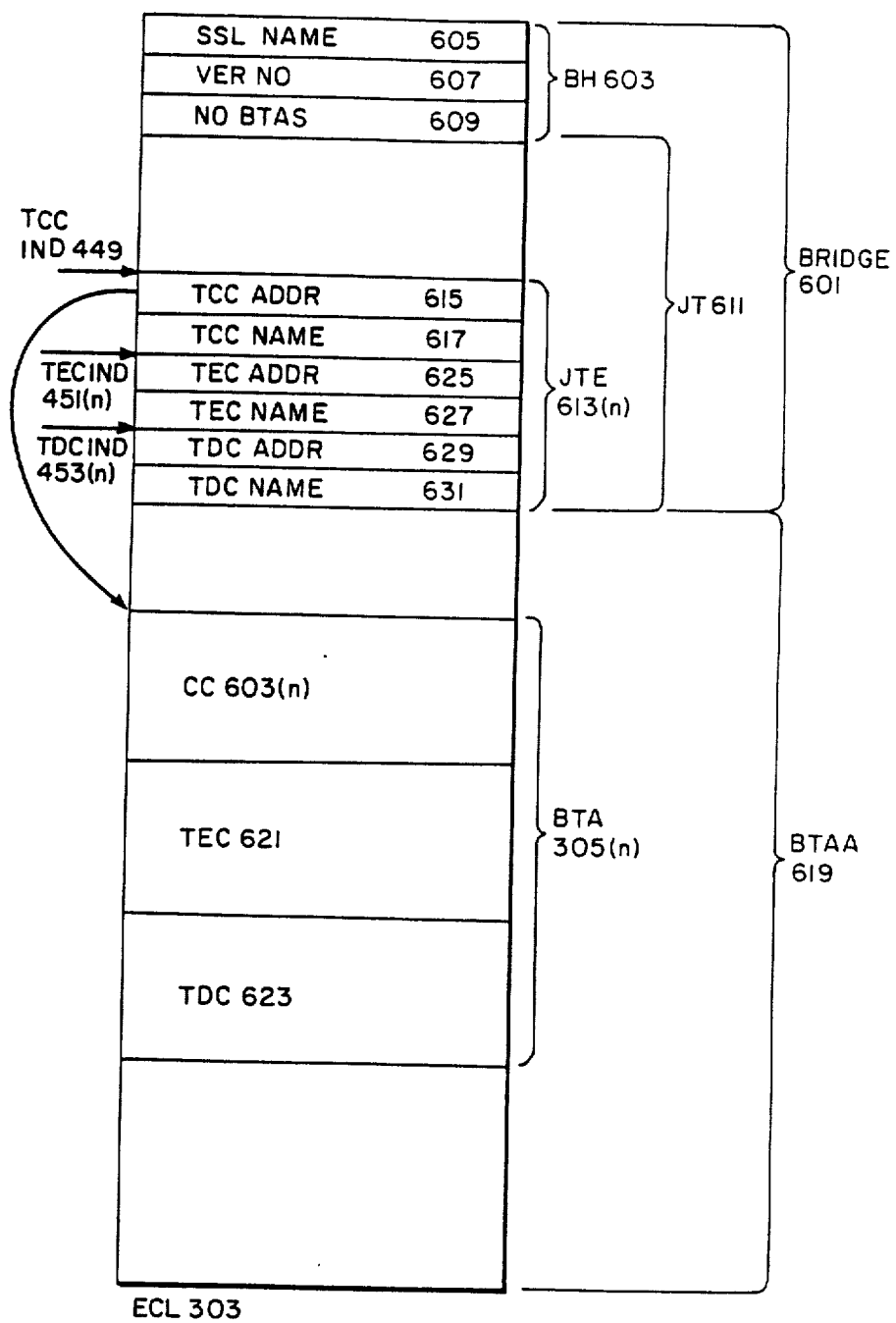
FIG. 6 is a detail of ECL 303 in a preferred embodiment.

6. Detailed Description of ODD 211: FIGS. 4–6

The following detailed description of ODD 211 will begin with BTDEF 213 and then deal with REFDEF 313 and ECL 303.

a. BTDEF 213: FIG. 4 BTDEF 213 is shown in the degree of detail required for the present discussion in FIG. 4. For purposes of that discussion, BTDEF 213 in a preferred embodiment has four major components: BTDEF table (BTDEFT) 401, which contains general information about the BT 101 being defined by BTDEF 213, and three arrays locatable by pointers in BTDEFT. The arrays are reference array (REFA) 403, key array (KEYA) 411, and field definition array (FDEFA) 421. When BTDEF 213 is stored on disk, BTDEFT 401 and the arrays are all part of a single record.

REFA 403 is an array of REFA entries (REFAE) 405. There is a REFAE 405 for every BT 101 to which the BT 101 defined in BTDEF 213 stands in a referenced or referencing relationship. Each REFAE 405 contains a key (REFKEY) 407 for REFDEF 323 representing the relationship and a pointer (REFPTR) 310 to that REFDEF 323. The identifier permits location of REFDEF 323 on disk and the pointer permits location of REFDEF 323 in memory.

KEYA 411 is an array of key array entries (KEYAE) 413. There is a KEYAE 413 for each key used to locate a row of BT 101 defined by BTDEF 213. In each entry there is KEYINFO 417, containing information about the key, and FNO 419, the index of the FDEF 215 for the field which serves as the key in FDEFA 421.

FDEFA 421 is an array of field definitions (FDEFs) 215. one FDEF 215 for every field in a row of the BT 101 being defined. Each FDEF 215 includes FOFF 423, the offset of the beginning of the defined field in the records which represent rows of BT 101, FLEN 425, the length of the defined field in the records, and FCOMPT 427, the computation type of the field. Among other things, FCOMPT 427 specifies whether the defined field is a BCDF 113, a CAF 109, or a SAF 105.

Continuing with BTDEFT 401, field 432, BTDEF-KEY, is a key which the relational data base system uses to locate BTDEF 213 when it is stored on disk. Fields 433-441 are run-time pointers (RPTRS) 429 which are set when a data base is being operated on to point to parts of ODD 211. NPTR 433 points to BTDEFT 401 for another BT 101 in the data base; if BTDEFT 401 is the first BTDEFT 401 in the chain of BTDEFTs 401, UPTR 435 points to a structure representing the user who is currently using the data base; that structure also contains a pointer by means of which the first BTDEFT 401 in the chain may be located. REFAPTR 437, KEYAPTR 439, and FLDAPTR point to the locations in memory of REFA 403, KEYA 411 and FDEFA 421 respectively. The next three fields relate BTDEF 213 to BT 101 which it defines. TNAME 443 is the name of BT 101; TFID 445 is the file identifier of the file which contains BT 101; TRLEN 447 is the length of the records which represent the rows of BT 101 in the file.

The next three fields, BTA INDS 431 are indexes which locate sections of code in BTA 305 corresponding to BTDEF 213. The three indexes are TCCIND 449, which locates CC 306 and is thus an implementation of TCCPTR 307, TECIND 451, which locates the code in BTA 305 for user-defined table exits actions, and TDCIND 453, which locates to the code in BTA 305 for user-defined default actions. The next six fields, 455 through 465, contain information about REFA 403, KEYA 411 and FDEFA 421 respectively. NO REFS 455 indicates the number of REFAEs in REFA 403 and REFAS 461 indicates the size of REFA 403; similarly, NO KEYS 457 indicates the number of KEYAEs 411 and KEYAS 463 the size of KEYA 411 and NOFDEFS 459 the number of FDEFS 215 and FDEFAS 465 the size of FDEFA 421. Finally, NO REFGAF 467 indicates the number of aggregate fields for which the defined BT 101 is the referencing BT 101 and REFDAF 469 indicates the number for which BT 101 is the referenced BT 101. AFCF 471, finally, is a flag indicating whether any of the aggregate fields for which BT 101 is the referencing BT 101 is conditional. As may be seen from the above, BTDEF 213 specifies where BT 101 is located, the size and fields of the records representing the rows, the keys used to access the records, the location of code relating to BT 101 in ECL 303, and the location of the REFDEF 313 for each of the other BTs 101 which BT 101 references or is referenced by.

b. REFDEF 313: FIG. 5 FIG. 5 shows as much detail of REFDEF 313 as is required for the present discussion. Like BTDEF 213, REFDEF 313 is maintained on the disk as a single record identified by a key. REFDEF 313 has five main components:

REFDEF table (REFDEFT) 501, which contains general information about the relationship between the referenced-referencing pair of BTs 101 represented by REFDEF 313, and four arrays, BCDA 503, AFA 513, REFD KFA 557, and REFG KFA 567.

BCDA 503 is an array of BCDA entries (BCDAEs) 505. There is one BCDAE 505 for each BCDF 113 of the referencing BT 101 which has a BCSF 115 in the referenced BT 101. Each BCDAE contains three items of data: REFD FNO 507, containing the index of a FDEF 215 for BCSF 115 in FDEFA 421 defining the referenced BT 101, REFG FNO 509, containing the index of a FDEF 215 for BCDF 113 in FDEFA 421 defining the referencing BT 101, and field maintained flag (FMF) 511, which indicates whether the BCDF 113 has the maintained attribute.

AFA 513 is an array of AFA entries (AFAEs) 515. There is one AFAE 515 for each aggregate field in referenced BT 101 whose value is dependent on rows in referencing BT 101. Each AFAE 515 contains three items of data REFD FNO 517 is the index of the FDEF 215 of the aggregate field in FDEFA 421 defining referenced BT 110, and is consequently an implementation of DFPTR 311 of FIG. 3. REFG FNO 519 is the index of the FDEF 215 for the field used to compute an agqregate sum in FDEFA 421 for referencing BT 101. If the aggregate field is a count field, the index is set to 0. FQF 521 is a field qualification flag and indicates whether the inclusion of a record in the sum or count field specified by REFD FNO 517 is dependent on a condition. If FQF 521 indicates a condition, CRA NO field 522 specifies which bit in CRA 327 indicates whether a given row in referencing BT 101 is to be included in the value of the field specified by REFD FNO 517.

REFD KFA 557 is an array specifying the fields in the rows of referenced BT 101 which provide PKEY 103 which serves as FKEY 111 in the rows of referencing BT 101. There is one REFD KFA entry (REFD KFAE) 559 for each of the fields so used. The fields of the entry are REFD KF ID 561, which contains an ID for the record representing the field in SDD 207, and REFD KFNO 563, which is the index of FDEF 215 for the field in FDEFA 421 of BTDEF 213 of the referenced BT 101. Thus, MC 317 can use REFD KFAE 559 to locate FDEF 215 for the field containing the key, can use the description of the field in FDEF 215 to locate the actual key field in the given row of the referenced BT 101, and can use the field s value to locate the related rows in referencing BT 101.

REFG KFA 567 is an array specifying the fields in the rows of referencing BT 101 which contain FKEY 111 in the rows of the referencing BT 101. There is one REFG KFA entry (REFG KFAE) 559 for each of the fields so used. As indicated by their names in the drawings, the fields are equivalent to those in REFD KFAE 559, and REFG KFAE 569 to locate the actual key field in a row of the referencing BT 101 and can use the value therein to located the related row in referenced BT 101. REFD KFA 557 and REFG KFA 567 are parallel arrays, i.e., for a given key, the REFD KFAEs 557 for the key's fields have the same indices in REFD KFA 557 as the REFG KFAEs 569 for the fields in REFG KFA 567.

Continuing with REFDEFT 501, REFDKEY 515 is the key by means of which the relational data base system of the preferred embodiment locates REFDEF 313. The value of REFDKEY 515 is contained in REFKEY 407 of REFA 403 in BTDEFs 213 for the referenced and referencing BTs 101. In a preferred embodiment, all of the REFDEFs 313 for a data base are arranged in a chain, and NREFDPTR 517 is a pointer to REFDEFT 501 for the next REFDEF 313 in the chain. NBCDF field 519 specifies the number of BCDFs 113 in referencing BT 101 which have BCDSFs 115 in the referenced BT 101. NAF field 521 specifies the number of SAFs 105 and CAFs 109 in the referenced BT 101 whose values depend on rows in the referencing BT 101.

The next group of fields, REFD INFO 523, contains information about referenced BT 101. REFD BTD PTR 525 is a pointer to the location of BTDEF 213 for referenced BT 101 in memory; REFD BTD KEY 527 is the value of BTDEF KEY 432 for the BTDF 213; both together are an embodiment of REFDPTR 312. REFD DEL A 529 is a code indicating which of the previously-explained actions is to be taken with regard to orphan rows when a row of referenced BT 101 is deleted and REFD MOD A 531 is a code indicating which of the actions is to be taken with regard to orphan rows when a key in a row of referenced BT 101 is changed. REFD VCS 533, finally, is the amount of virtual memory space required to execute the validation condition code in CC 306 for the referenced BT 101.

The following group of fields, REFG INFO 535 contains the equivalent information for referencing BT 101. REFG BTD PTR 537 and REFG BTD KEY 539 are respectively pointer to and key of BTDEF 213 for the referencing BT 101, and thus are an implementation of REFGPTR 314. REFG MOD A 541 is a code indicating which of the previously-explained actions is to be taken when an addition or modification of a row in referencing BT 101 results in an orphan, and REFG VCS 543 is the amount of virtual memory space required to execute the validation condition code in CC 306 for the referencing BT 101. The remaining fields have the following functions: CF 315, as previously explained, indicates whether any of the aggregate fields represented by AFAEs 515 is conditional; MAINTF 547 indicates whether any of the BCDFs 113 represented by BCDAEs 505 has the MAINTAINED attribute. If CF 315 indicates that there are conditional aggregate fields, CRAPOS 549 indicates the position in CRA 327 at which the bits may be found. BCDA PTR 551 is a pointer to BCDA 503, and AFA PTR 553, finally, is a pointer to AFA 513. As may be seen from the above, REFDEF 313 for each PKEY 103 in a referenced-referencing pair of BTs 101 specifies the location of BTDEF 213 for each of the pair, the actions to be taken with regard to orphan rows resulting from deletion or modification of a row in referenced BT 101 or from addition or modification of a row in referencing BT 101, the BCDFs 113 and the BCDSFs 115 relevant to the rows specified in the referenced-referencing pair, the aggregate fields relevant to the rows in the referencing pair, and the bits in CRA 327 relevant to the aggregate fields.

c. ECL 303: FIG. 6

As previously explained in overview, ECL 303 is a shared subroutine library which contains the BTAs 305 for a data base. In a preferred embodiment, ECL 303 is a single file. ECL 303 in a preferred embodiment is illustrated in FIG. 6. Beginning with the major components of that figure, BRIDGE 601 contains bridge header (BH) 603 with general information about ECL 303 and a jump table (JT) 611 which permits location of sections of BTAs 305. The BTAs 305 are contained in BTA array (BTAA) 619. For the sake of clarity, only a single BTA 305, BTA 305(n) is show. It has three sections: CC 603(n), containing the code for the validation conditions, the conditions governing aggregate fields, and for computed fields in a row which are defined as being the result of a computation involving other fields in the row, TEC 621, containing the user-defined exit code, and TDC 623, containing the user-defined default code.

BH 603 in a preferred embodiment has three fields: SSL NAME 605, which contains the name of by which the subroutine library is identified. In the present invention, that name is derived from the name of the data base to which ECL 303 belongs. VER NO 607 is the version number of ECL 303; NO BTAs 609 is the number of BTAs 305 contained in ECL 303. JT 611 is made up of a JT entry (JTE) 613 for each BT 101 in the data base. For the sake of clarity, only a single JTE 613, that for BT 101(n), is shown. Each JTE 613 has a pair of fields for each of the sections in BTA 305. One of the pair contains the address of the section in BTA 305 and the other an eight-character name. The name is supplied purely for convenience in debugging. Thus, TCC ADDR 615 is the address of CC 306(n), TCC NAME 617 is the name for that code, TEC ADDR 625 is the address of TEC 621 and TEC NAME 627 is its name, TDC ADDR 629 is the address of TDC 623, and TCD NAME the name for that code. JTE 613(n) for BT 101(n) is located by means of ECL INDS 431 in BTDEFT 401 of BTDEF 213(n). TCCIND 449 locates TCC ADDR 615, TECIND 451 locates TEC ADDR 625, and TDCIND 453 locates TDC ADDR 629.

ECL 303 is produced as follows: As previously indicated, when a user defines a BT 110 via user workstation (UW) 201, he provides inputs which specify validation conditions, aggregation conditions, computations by means of which a field is verified, and the names of routines to be executed when a BT 110 is modified or on retrieval of a default record for BT 110. The validation conditions, aggregation conditions, and computations are maintained as COBOL source code in SDD 207. When SDD COMP 209 compiles SDD 207 to produce ODD 211, SDD COMP 209 first creates BH 603. Then it takes each definition of a BT 100 from SDD 207 and produces BTDEF 213 and JTE 613 and BTA 305 for the BT 100. When JTE 613 is created, TCCIND 449, TECIND 451, and TDCIND 453 of BTDEF 213 are filled with the indexes of those parts of JTE 613 from the beginning of JT 611. SDD COMP 209 then produces BTA 305 by compiling the COBOL source code from SDD 207 or the source code specified for the table exits or default exits. After BTA 305 has been compiled, SDD COMP 209 links it into ECL 621. When it does so, it places address constants indicating the locations of the sections of BTA 305 into the corresponding address fields of JTE 613.

When the data base is opened for a user to perform operations on its contents, an operating system MAP service maps ECL 303 into the virtual memory belonging to the process which is performing the operation on the data base. MAP gives the process its own copy of JT 611 and uses the constants in the address fields of each of the JTEs 613 in the copy to compute the virtual addresses of the sections of BTA 305. MAP then replaces the constants in the copy with the virtual addresses. To invoke a section of a BTA 305, MC 317 computes the address of the proper part of JTE 613 by computing an offset using the proper one of ECL INDS 431 and adding the offset to a pointer indicating the beginning of the copy of JT 611 in virtual memory. The pointer in that part of JTE 613 is then used to invoke the code in the relevant part of the BTA 305 corresponding to the JTE 613.

7. Creating Referenced-Referencing Pairs with Dependent Fields: FIGS. 7–11

Figure 7:
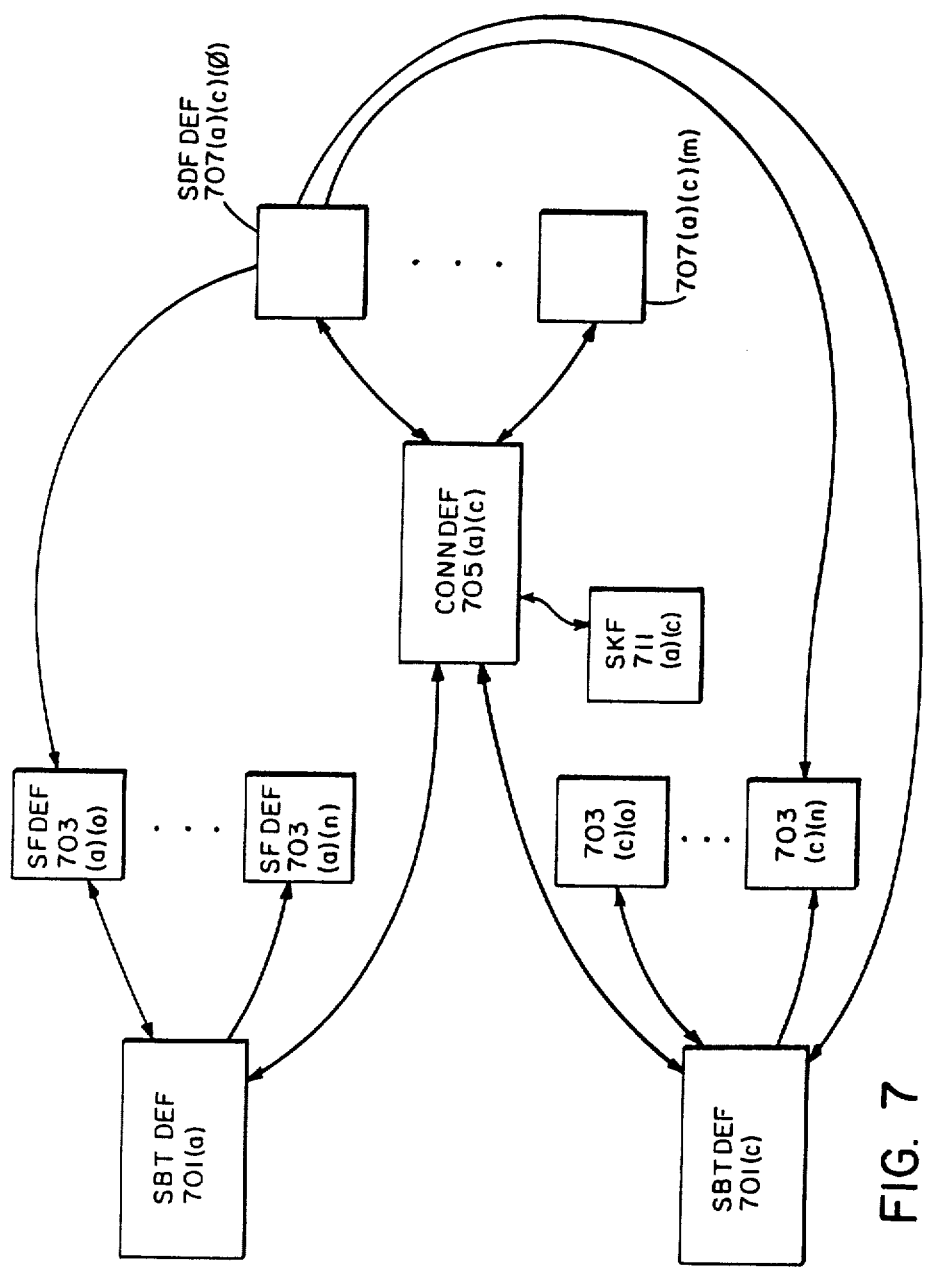
FIG. 7 is an overview of data structures in SDD 207 for referencing and referenced BTs 101.

The foregoing has described the structure and operation of the invention as it is employed during data base operations performed by DBRT 227; the following will describe the manner in which a user of the relational data base system of the present invention creates referenced-referencing BT 101 pairs with dependent fields. The description will begin with those structures in structures in SDD 207 which are the source of BTDEF 213, REFDEF 313, and ECL 303 and will conclude with the screens which the user employs on UW 201 to define the referenced-referencing pair and the dependent fields.

a. Overview of SDD 207: FIG. 7

FIG. 7 is an overview of those portions of SDD 207 which are relevant to the present invention. In the figure, rectangles represent data structures and arrows represent location information which permits one data structure to be located from another. In the preferred embodiment, the data structures are implemented as records in BTs 101 of a data base of the present invention. The location information thus takes the form of keys representing relationships between referenced and referencing BTs 101 in SDD 207.

FIG. 7 shows the data structures in SDD 207 necessary to represent the referenced-referencing pair BT 101(a) and BT 101(c). SDD 207 contains a BT 101 which has a row which appears in FIG. 7 an a source BT definition data structure (SBTDEF) 701 for every BT 101 in the data base. SBTDEF 701 contains general information about the corresponding BT 101. The BT 101 represented by an SBTDEF 701 is indicated by the subscript following the reference number. The BT 101 containing SBTDEF 701 has a referencing BT 101 which contains a row for each field defined in the data base. That row appears as SFDEF 703. Each SFDEF 703 has a FKEY 111 which is a PKEY 103 of SBTDEF 701 for BT 101 for which the fields are defined, permitting location of a BT 101's SFDEFs 703 from SBTDEF 701 and the location of SBTDEF 701 from any of the SFDEFs 703. The subscripts following the reference number indicate which BT 101 and which field of that BT 101 the definition is for.

When two defined BTs 101 are a referenced-referencing pair or participate in a view table, there is a connection between the two BTs 101, and a third BT 101 of SDD 207 which contains rows defining all such connections in the data base. The row appears in FIG. 7 as CONNDEF 705. The BT 101 containing CONNDEF 705 is a referencing BT 101 with regard to the BT 101 of SBTDEF 701, and thus, the SBTDEFs 701 for the connected tables may be located from CONNDEF 705. When CONNDEF 705 represents a relationship between the rows of a referenced-referencing pair, it includes data which defines three attributes of the relationship: the name by which a user may ascend from the referencing BT 101 to the referenced BT 101 and the name by which the user may descend from the referenced BT 101 to the referencing BT 101, and the manner in which the referenced-referencing pair deals with changes in the rows involved in the relationship which produce orphan records.

When CONNDEF 705 represents such a relationship, BT 101 containing CONNDEF 705 is further a referenced BT 101 for two further BTs 101 which are of interest when the connection between the BTs 101 is that of rows related by PKEY 103 and FKEY 111. One of the BTs 101 contains rows indicated in FIG. 7 by SKF 711 for each of the fields in the keys used to relate rows in referenced-referencing pairs. The other, represented by source dependent field definitions (SDFDEF) 707, contains rows defining the fields involved in the base copy down dependency and the aggregate dependencies and any conditions on those dependencies. Each SDFDEF 707 is further a referencing BT 101 for the BT 101 containing SBTDEF 701 and the BT 101 containing SFDEF 703. Thus, the SFDEFs 703 involved in the dependency and, if there is a condition, the SBTDEF 701 for the referencing BT 101 are locatable from SDFDEF 707. For example, in FIG. 7, SDFDEF 707 (a)(c)(0) may be taken to represent a sum aggregate field; the arrow to SFDEF 703(a)(0) is to the definition of the sum aggregate field in the referenced BT 101, while the arrow to SF 703(c)(n) is to the definition of the field in the referencing BT 101 which is summed. The arrow to SBTDEF 701 (c) is to the SBTDEF 701 for the referencing BT 101 when there is a condition involved.

b. Detail of SDFDEF 707: FIG. 8

SDFDEF 707 is shown in detail in FIG. 8. The first two fields of SDFDEF 707 compose SDFDEF KEY 802, the means by which the data base system locates SDFDEF 707. The two fields in the key are SDFDEFTY 801, which specifies that the record is an SDFDEF 707, and SDFDEFID 803, which identifies a given SDFDEF 707. The next six fields are locators permitting location of the relevant CONNDEF 705 and SFDEFs 703 from SDFDEF 707. CONN LOC 805 is the key for CONNDEF 705 to which SDFDEF 707 belongs; REFD FD LOC 807 is the key of SFDEF 703 for the field of referenced BT 101 involved in the dependence; REFG FD LOC 809 is the key of SFDEF 703 for the field, if any, of referencing BT 101 involved in the dependency. Each of these keys consists of a type value, identifying the type of record being located, and an identifier, identifying the specific record.

The remaining fields of SDFDEF 707 describe the relationship between the dependent fields specified by REFD FD LOC 807 and REFG FD LOC 809. REFG SBTD LOC 810 is the key of SBTDEF 701 for the referencing BT 101. COMP TYPE 811 indicates whether the relationship involves a sum or count aggregate field in the rows of referenced BT 101 or a base copy down field in referencing BT 101. If the relationship is a conditional aggregate field, fields 813 - 823 define the condition. COND TEXT 813 contains character codes representing the actual text of the condition. In a preferred embodiment, the condition is written using a COBOL-like syntax. N COND FLD 815 indicates the number of fields in a row of referencing BT 101 which are involved in the condition. CONDF 817 is a flag which indicates whether there is a condition in SDFDEF 707. COND ERRC 823 is an error code produced by IDDEF INT 205 if the input it receives from UW 201 does not properly define a condition. IDDEF INT 105 then uses the error code to return a message identifying the error to UW 201. BCD TYPE 825, finally, is used when the dependency represented by SDFDEF 707 is between a BCDSF 115 and a BCDF 113 to indicate whether the BCDF 113 has the MAINTAINED attribute.

As can be seen from the foregoing descriptions of SDD 207 and SDFDEF 707, SBT DEF 701 and the SFDEFs 703 associated therewith contain the information which SDD COMP 209 requires to produce BTDEF 213 for a BT 101, while CONNDEF 705, RATTR 707, and the SDFDEFs associated with CONNDEF 705 contain the information which SDD COMP 209 requires to produce REFDEF 313 and the aggregate field condition code in BTA 305. Information required for table validation conditions and table exit actions is stored in SBTDDEF 701 and information required for a field whose value is computed according to a formula is stored in SFDEF 703 for the field in the same manner as shown for SDFDEF 707.

c. Screens used to Define Dependent Fields: FIGS. 9-11 As previously mentioned, in the data base system in which the present invention is implemented, users define the data base by inputting information into screens displayed on UW 201 by IDDEF INT 205. A set of screens which would be typically used to define a BT 101, make two previously-defined BTs 101 into a referenced-referencing pair, and define a SAF 105 are shown in FIGS. 9-11.

Beginning with FIG. 9, that figure shows screens used to define BTs 101 and fields therein. The BT 101 itself is defined by Add Base Table screen 901. The user of the system inputs the name of the table at the string of asterisks labelled 907, selects the kinds of modifications permitted on the table at 909, specifies an estimated length and number of records at 911, selects a security class at 913, and provides the names of the source code for any table exit action or default action at 903. IDDEF INT 205 uses these inputs to construct SBTDEF 701 for the BT 101. The fields in BT 101 are defined by means of Add Field Screen 901. For each field, the user specifies the name of the field at 915, the data type of the field at 917, and the size of the field and the number of time it occurs at 919. IDDEF INT 205 uses the inputs from this field to construct SFDEF 703 for the field.

Continuing with FIGS. 10 and 10A, FIG. 10 shows the screens used to define two BTs 101 as a referenced-referencing pair. Screen 1001 displays a list of the BTs 101 presently defined for the data base and permits the user to choose one as a referenced (parent) BT 101. Screen 1003 displays the list of the BTs 101 and permits the user to choose one as a referencing (child) BT 101 of the referenced BT 101 just selected. IDDEF INT 205 uses the inputs from these screens to construct CONNDEF 705 for the pair. FIGS. 10A and 10B show screens used to more closely define the nature of the referenced-referencing pair. Pick Parent Key screen 1005 permits the user at field 1007 to name PKEY 103 from the rows of referenced BT 101 which will be used as FKEY 111 in the rows of referencing BT 101. Add Relationship-Fields screen 1009 permits the user to name the fields of the referenced and referencing BTs 101 which will contain the key. Field 1011 receives the name of the field(s) in the referenced BT 101 and field 1013 receives the name of the field in the referencing BT 101. FIG. 10B, finally, shows Add Relationship - Attributes screen 1015, which permits the user to define the attributes of the referenced - referencing relationship. There are three such attributes: the ascend name, the descend name, and the actions to be performed regarding orphans. The ascend name and the descend name, defined in the fields labelled 1017, represent the actions of navigating from a row in the referencing BT 101 to the related row in the referenced BT 101 and of navigating from the row in the referenced BT 101 to a row in the referencing BT 101 respectively. When a user provides the names to DBRT 227, DBRT 227 performs the specified navigation. Field 1019 permits the user to select what action the system will perform if a change to a row in either BT 101 of the pair results in orphan rows. IDDEF INT 205 places the information from these fields in CONNDEF 705 and RATTR 707.

Once the user has defined a referenced-referencing pair of BTs 101, he can define dependent fields. FIGS. 11 and 11A show the screens used to define a sum aggregate field 105. Beginning with Modify Field - Data Attributes screen 1103 in that figure, the screen is used to modify the data attributes of the field specified following Field Name. Computation field 1101, which selects the computation attribute of the field, is of particular interest. The user selects the contents of the field from the list to the right of the field, which includes Sum, specifying a SAF 105, Count, specifying a CAF 109, and BaseCopyDown, specifying a BCDF 113. If the user selects Sum, the next screen is Pick Table for Computation screen 1111. In that screen, field 1105 indicates the name of SAF 105 in referenced BT 101. The user specifies the referencing BT 101 in field 1107 and the descend name in field 1109.

The next screen provided by IDDEF INT 205 is Pick Field for Computation screen 113 in FIG. 11A. Screen 113 provides a list 114 of the fields in the referencing BT 101 which have the proper type to be summed for SAF 105, and the user selects one of them as the source of the values to be summed. Finally, IDDEF INT 205 provides Add Field Computation 115, which permits the user to define a condition for the sum in field 117. The condition defined therein by 'Order-Status='-'BOOKED'" indicates that the value of the field Order Value in a given row of referencing BT 101 is to be added to the value of Account Balance in a related row of referenced BT 101 only if the field Order Status in the given row has the value BOOKED. Using a different screen, a user can define computations depending on other fields within a row in the same fashion as the condition is defined here. The information collected via screens 1103, 1111, 1113, and 1115 is placed by IDDEF INT 205 into SDFDEF 707.

8. Conclusion

The foregoing Description of a Preferred Embodiment has shown how a relational data base system may be constructed which permits the user to define dependencies between rows of referenced and referencing BTs 101 which are recomputed whenever a row from which another row is dependent is added, deleted or modified. The Description has shown how the user may define the dependent values and conditions defining their dependency in the system's data dictionary and how the relational data base system maintains them during operation of the data base system. In the preferred embodiment, the dependencies include sum aggregate fields, which contain the sum of fields in a set of related rows in the referencing BT 101, count aggregate fields, which contain the count of related rows in the referencing BT 101, and base copy down fields, which are copied from a field of a referenced BT 101 into fields of related rows in the referencing BT 101. As indicated herein, in other embodiments, other dependencies, including maximums and minimums and average values may be maintained.

The description has further shown how the user may define validation conditions which are checked and exit actions which are performed whenever a BT 101 is modified and default actions which are performed whenever a new row is initialized for a BT 101.

Using the general techniques described herein, other actions may be specified for performance upon modification of a BT 101. Moreover, the description has shown how the user may define and the data base system may execute various actions when a modification of a BT 101 produces orphan rows in a referencing BT 101. Finally, the description has shown how a user may define a relational data base incorporating the present invention by inputting data to fields of screens on his terminal.

The invention described herein may have many variations. For example, other types of aggregate fields may be defined or base copy down fields may be made conditional. Moreover, inputs to the data dictionary may be received via command line or file as well as via screens, and the relationships between the referenced and referencing BTs 101 may be represented by data structures other than those used in the present implementation. Thus, the preferred embodiment described herein is to be considered in all respects as illustrative and not restrictive, the scope of the invention being indicated by the appended claims rather than the foregoing description, and all changes which come within the meaning and range of equivalency of the claims are intended to be embraced therein.

What is claimed is:

1. In a relational data base system including data dictionary means, a first base table and a second base table, each of which has at least one user-defined row defined in the data dictionary in such fashion that the first base table and the second base table are referenced and referencing, and operational means responsive to data base operation commands and to the data dictionary for performing operations on the rows,
    means for maintaining a dependence between a first user-defined field in a row in one of the base tables and a row in the other of the base tables comprising:
    dependence defining means in the data dictionary for defining the dependence; and
    means in the operational means responsive to the dependence defining means for reestablishing the dependence as defined in the dependence defining means whenever a data base operation alters the row.

2. In the dependence-maintaining means of claim 1 and wherein:
    the dependence defining means further includes condition defining means for defining a condition to which the dependence is subject; and
    the dependence reestablishing means is further responsive to the condition defining means and reestablishes the dependence as determined by the condition.

3. In the dependence-defining means of claim 2 and wherein: the condition defining means includes
    executable condition code for testing whether the condition exists and result indicating means for indicating the result of an execution of the condition code and
    the dependence reestablishing means responds to the condition defining means by executing the condition code before altering the row, determining a first result from the result indicating means, altering the row, again executing the condition code, determining a second result from the result indicating means, comparing the first and second results, and reestablishing the dependence when the comparison indicates that the alteration of the row affected the condition.

4. In the dependence-maintaining means of claim 1 and wherein:
    the one base table is referenced by the other base table;
    the dependence-defining means defines the user-defined field as containing an aggregate value representing a characteristic of certain rows in the other base table; and
    the dependence reestablishing means recomputes the aggregate value whenever a data base operation changes the characteristic.

5. In the dependence-maintaining means of claim 4 and wherein:
    only the dependence-reestablishing means changes the value of the user-defined field.

6. In the dependence-maintaining means of claim 4 and wherein:
    the dependence defining means further includes condition defining means for defining a condition to which the dependence is subject; and
    the dependence reestablishing means is further responsive to the condition defining means and recomputes the aggregate value as determined by the condition.

7. In the dependence-defining means of claim 6 and wherein: the condition defining means includes
    executable condition code for testing whether the condition exists and result indicating means for indicating the result of an execution of the condition code and
    the dependence reestablishing means responds to the condition defining means by executing the condition code before altering the row, determining a first result from the result indicating means, altering the row, again executing the condition code, determining a second result from the result indicating means, comparing the first and second results and recomputing the aggregate value when the comparison indicates that the alteration of the row affected the condition.

8. In the dependence-maintaining means of claim 7 and wherein:
    the aggregate value is a count of the certain rows; and
    the dependence reestablishing means recomputes the count by incrementing or decrementing the count as indicated by the comparison.

9. In the dependence-maintaining means of claim 7 and wherein:
    the aggregate value is a sum of the values of a second user-defined field in each of the certain rows; and
    the dependence reestablishing means recomputes the sum by adding the difference between the value of the second user-defined field before the alteration and the value of the second user-defined field after the alteration to the aggregate value.

10. In the dependence-maintaining means of claim 6 and wherein:
    the value of the condition is dependent on the value of a second user-defined field in the rows of the other data base.

11. In the dependence-maintaining means of claim 6 and wherein:
    the value of the condition is dependent on a value defined by the relational data base system.

12. In the dependence-maintaining means of claim 4 and wherein:

the aggregate value is a count of the certain rows; and
the dependence reestablishing means recomputes the count whenever a data base operation changes the number of the certain rows.

13. In the dependence-maintaining means of claim 4 and wherein:
the aggregate value is a sum of the values of a second user-defined field in each of the certain rows; and
the dependence reestablishing means recomputes the sum whenever a data base operation changes the value of the second user-defined field in any of the certain rows.

14. In the dependence-maintaining means of claim 1 and wherein:
the one base table is referenced by the other base table;
the dependence defining means defines a copydown field in each row of the other base table as containing a copy of the current value of the user-defined field; and
the dependence reestablishing means copies the current value of the user-defined field into the copydown fields of the rows whenever a data base operation changes the value of the user-defined field.

15. In the dependence-maintaining means of claim 14 and wherein: only the dependence-reestablishing means changes the value of the copydown field.

* * * * *